July 8, 1958

D. L. WEEKS 2,842,312

CARD READING APPARATUS

Filed March 23, 1955

INVENTOR
DONALD L. WEEKS
BY
HIS ATTORNEYS

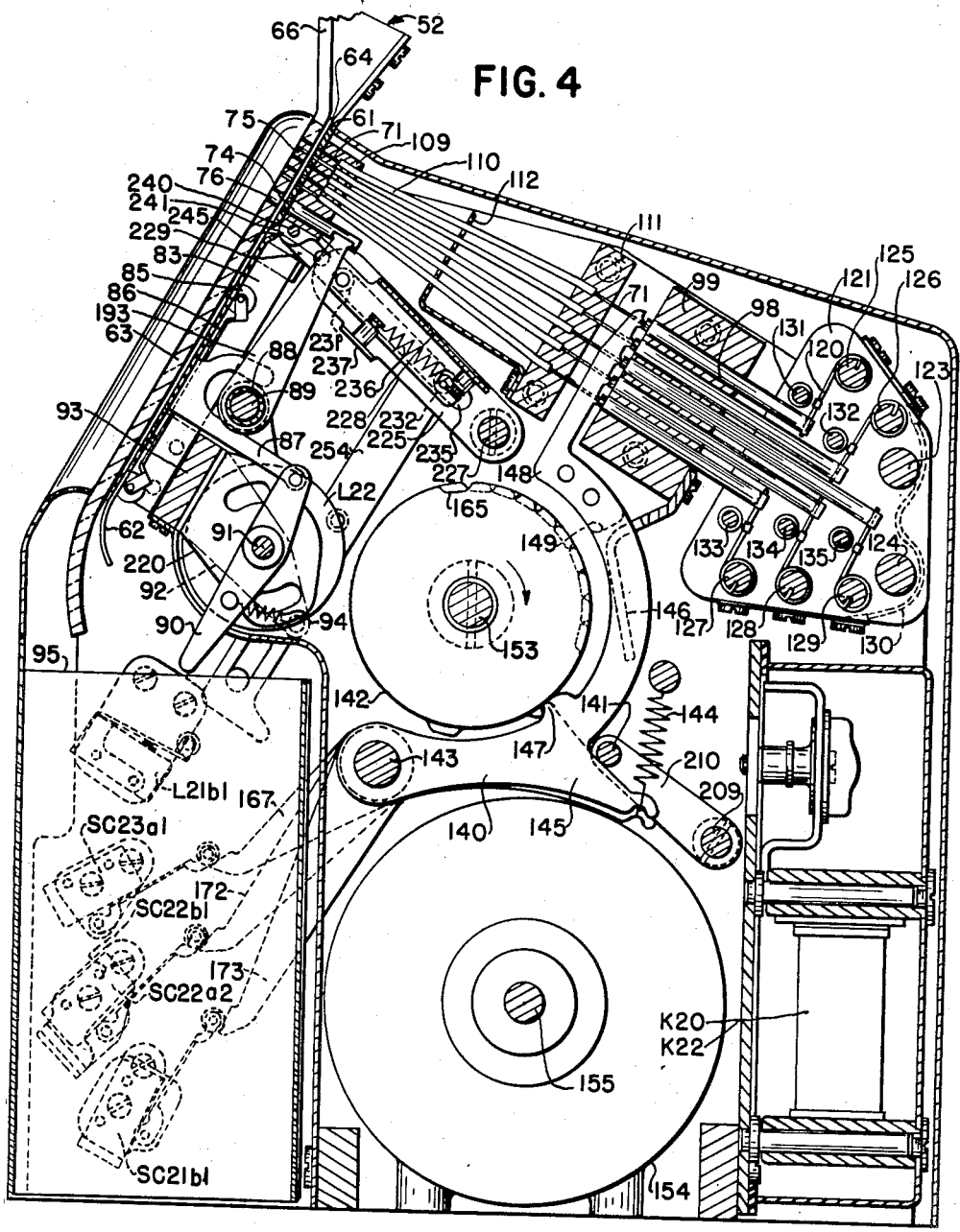

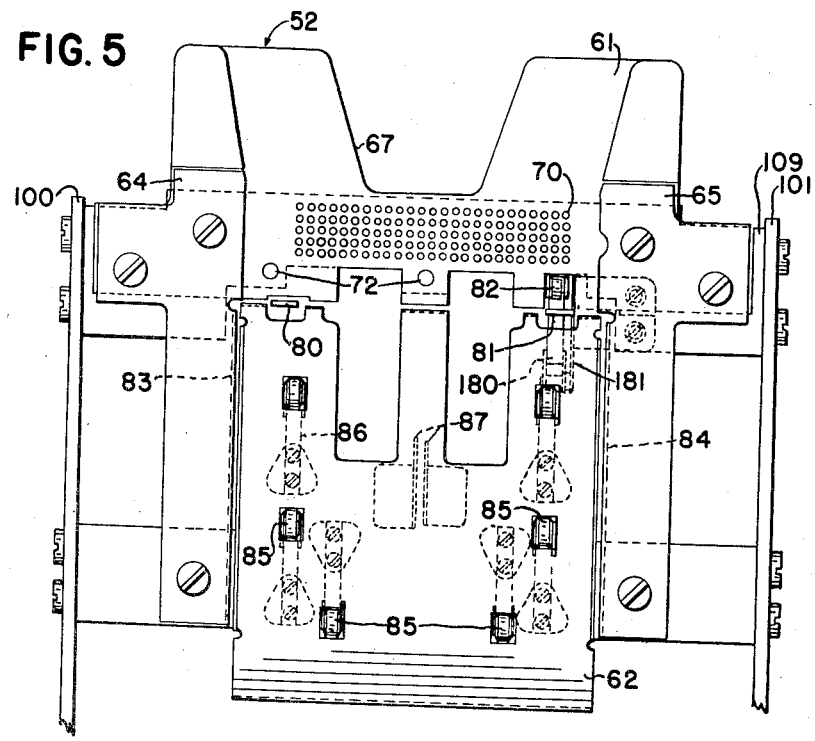

July 8, 1958
D. L. WEEKS
2,842,312
CARD READING APPARATUS
Filed March 23, 1955
12 Sheets-Sheet 4
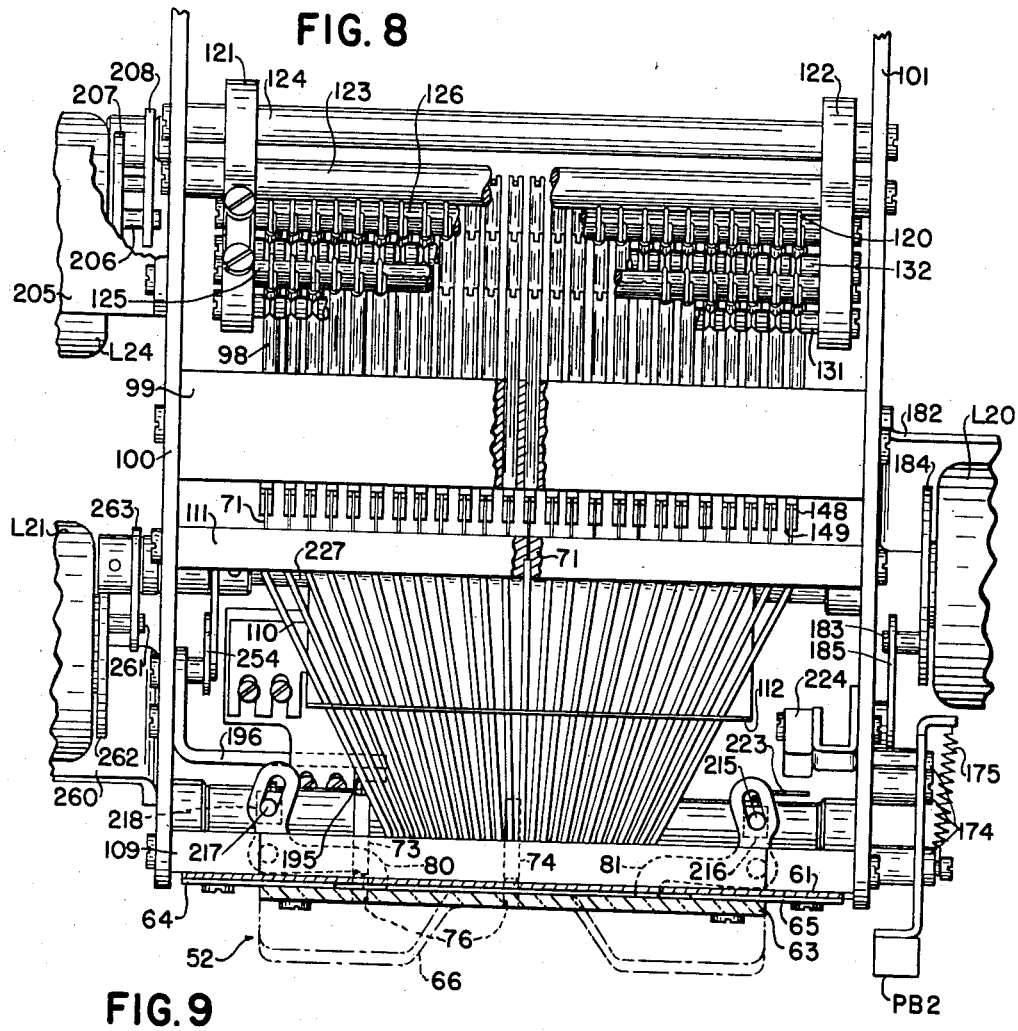
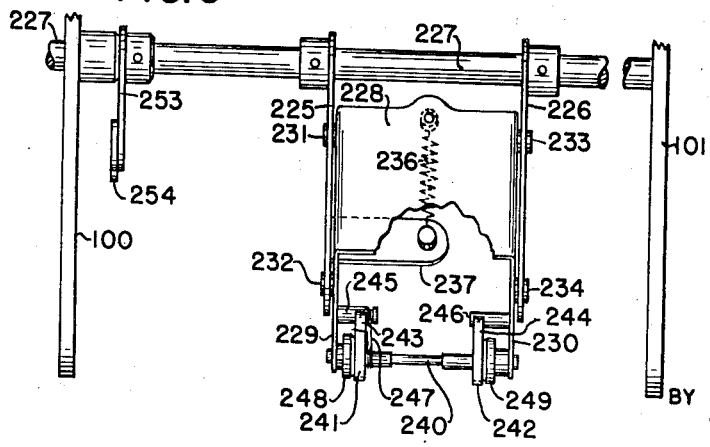
INVENTOR
DONALD L. WEEKS
BY
HIS ATTORNEYS July 8, 1958 D. L. WEEKS 2,842,312
CARD READING APPARATUS
Filed March 23, 1955 12 Sheets-Sheet 5
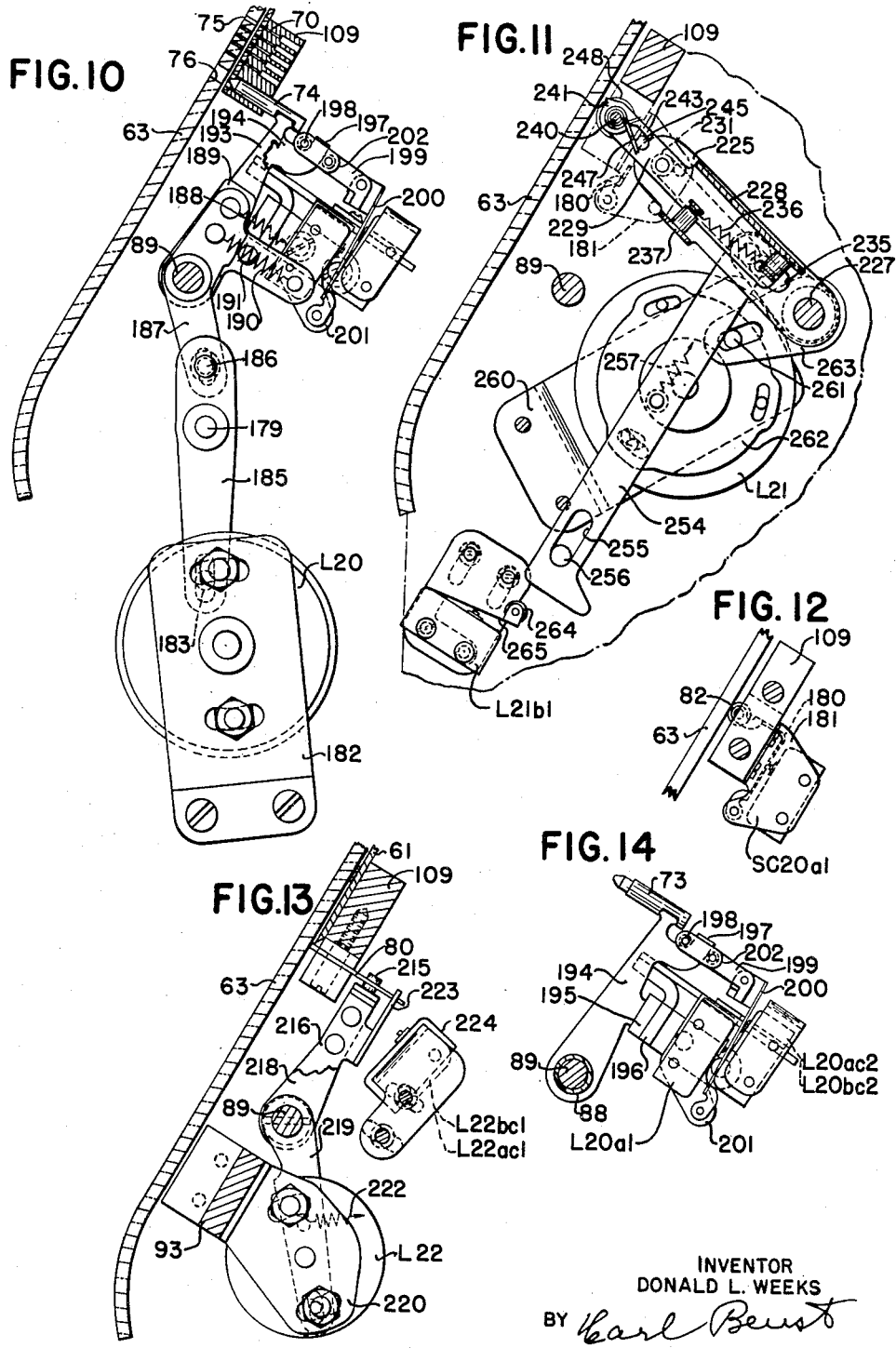
INVENTOR
DONALD L. WEEKS
BY Carl Beust
Louis A. Kline
HIS ATTORNEYS July 8, 1958  D. L. WEEKS  2,842,312
CARD READING APPARATUS
Filed March 23, 1955  12 Sheets-Sheet 6

INVENTOR
DONALD L. WEEKS
BY Carl Beust
Louis A. Kline
HIS ATTORNEYS

July 8, 1958

D. L. WEEKS 2,842,312

CARD READING APPARATUS

Filed March 23, 1955

INVENTOR
DONALD L. WEEKS

BY

HIS ATTORNEYS

July 8, 1958

D. L. WEEKS 2,842,312

CARD READING APPARATUS

Filed March 23, 1955

INVENTOR
DONALD L. WEEKS
BY
HIS ATTORNEYS

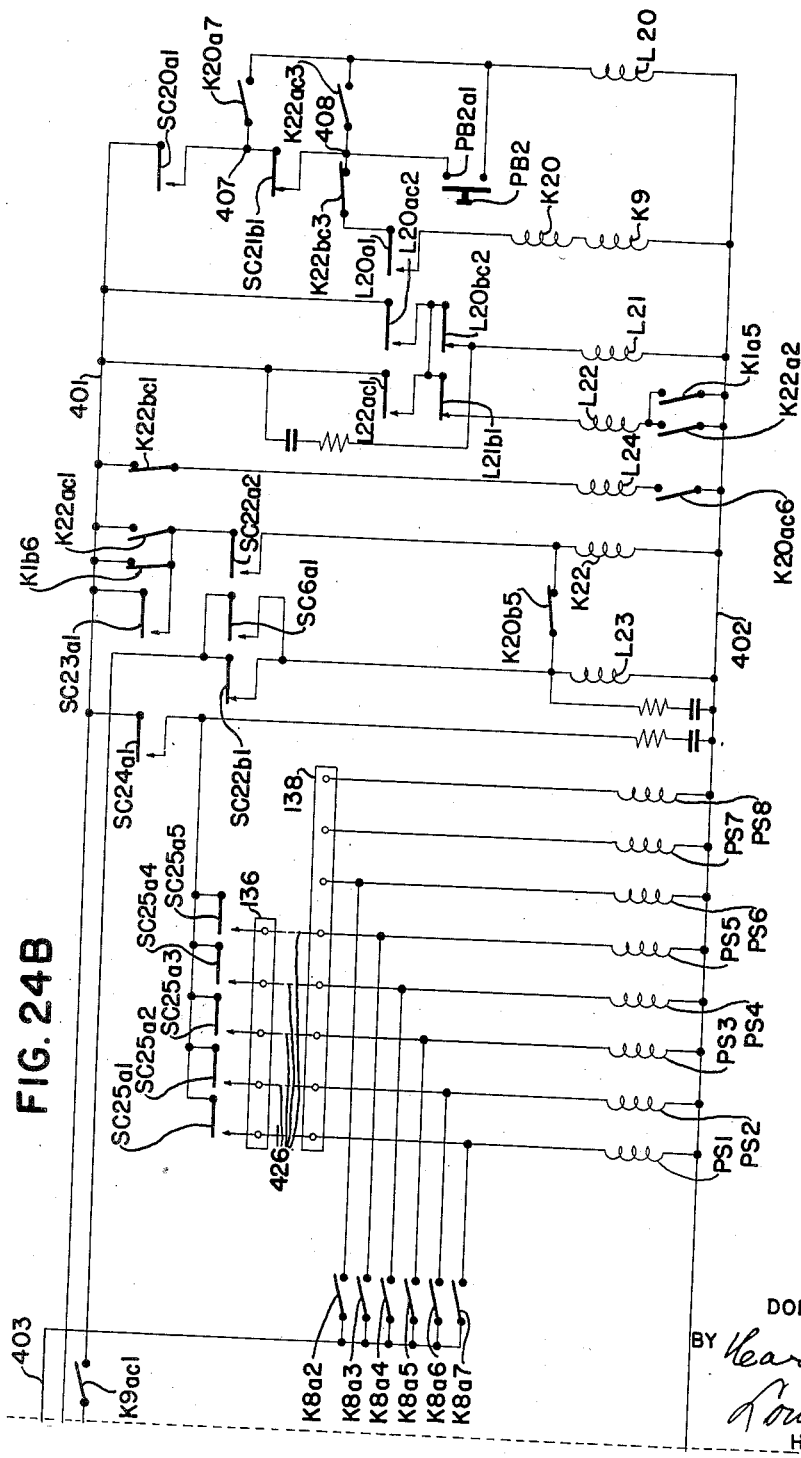

United States Patent Office 2,842,312
Patented July 8, 1958

2,842,312

CARD READING APPARATUS

Donald L. Weeks, Dayton, Ohio, assignor to The National Cash Register Company, Dayton, Ohio, a corporation of Maryland Application March 23, 1955, Serial No. 496,173

22 Claims. (Cl. 235—61.11)

This invention relates to a novel card-reading apparatus and particularly relates to an apparatus for reading data, column by column, from a card while the card remains stationary in card-reading position.

The novel card-reading apparatus has several unique features, which make it very positive in operation and enable a high degree of accuracy in reading data to be obtained.

First, the reading or sensing means is provided with a sensing pin for each possible data-representing position in each column and is provided with alining means, which engage the card in reading position to accurately aline the card with the sensing pins. This allows very small perforations to be used to represent the data.

Second, the alining means cooperates with the card to lock the card in reading position until all the desired columns of the card have been read.

Third, the sensing means is so controlled that the sensing pins for the several columns of the card are normally held in their ineffective position and are rendered operable column by column as the card is sensed, whereby accurate control of the sensing of data is obtained.

Fourth, novel switching means are controlled by the sensing pins for the various columns to convert the data, as sensed by the pins, into electrical signals, which may be sent to an apparatus which utilizes the sensed data.

Fifth, the sensing means is further controlled from the apparatus which utilizes the sensed data in such a manner that the data sensed from one column on the card must have effected its control on the apparatus which utilizes the sensed data before the sensing means can sense the next column on the card.

Sixth, adjustable control means is provided for the sensing means to terminate the sensing operation after any desired number of columns of the card have been sensed and to feed the card from sensing position.

The manner in which these various features are coordinated in the novel apparatus will be clear from the following description.

It is an object of the invention, therefore, to provide a card-reading apparatus which is positive in its operation and simple in construction, and can read a card column by column while the card remains stationary in reading position.

A further object of the invention is to provide a sensing means for sensing a card column by column, which sensing means includes a plurality of normally ineffective sensing pins, one for each possible data position on a card, and includes control means to render the sensing pins effective to sense one column at a time in sequence.

A further object of the invention is to provide a card-reading apparatus having a sensing means of the cyclically-operable type which will not sense a further column on a card until the data which has been sensed in a column has been utilized by an apparatus which is controlled by the sensing means.

A further object of the invention is to provide a card-reading apparatus which includes a sensing means having a simplified switching means for translating movement of sensing pins into electrical signals corresponding to the data which is sensed.

A further object of the invention is to provide a sensing means for sensing data column by column on a record card while the card remains stationary in sensing position and to provide an adjustable control for terminating the sensing operation after a predetermined number of columns on the card have been sensed.

With these and other, incidental, objects in view, the invention includes certain novel features of construction and combinations of parts, a preferred form or embodiment of which is hereinafter described with reference to the drawings which accompany and form a part of this specification.

In the drawings:

Fig. 4 is a vertical section through the card-reading apparatus.

Fig. 5 is a front view of the card chute with the front transparent cover removed.

Fig. 6 shows a cam line which controls when the various columns of the sensing means will be effective and which also provides other controls.

Fig. 7 is a section through the cam line, taken along the line 7—7 of Fig. 6, showing several of the cams together with certain switch-operating arms which cooperate therewith.

Fig. 8 is a top plan view of the reading apparatus with certain parts broken away to show other parts more clearly.

Fig. 9 is a top plan view of the card-advancing means.

Fig. 10 is a detail view of the alining-pin-actuating means.

Fig. 11 is a detail view of the operating means for the card-advancing means.

Fig. 12 is a detail showing the card-operated switch which is closed by the card when the card is placed in reading position.

Fig. 13 is a detail view of the stop-arm-operating means.

Fig. 14 is a further detail of the alining-pin-positioning means.

Figure 24A:
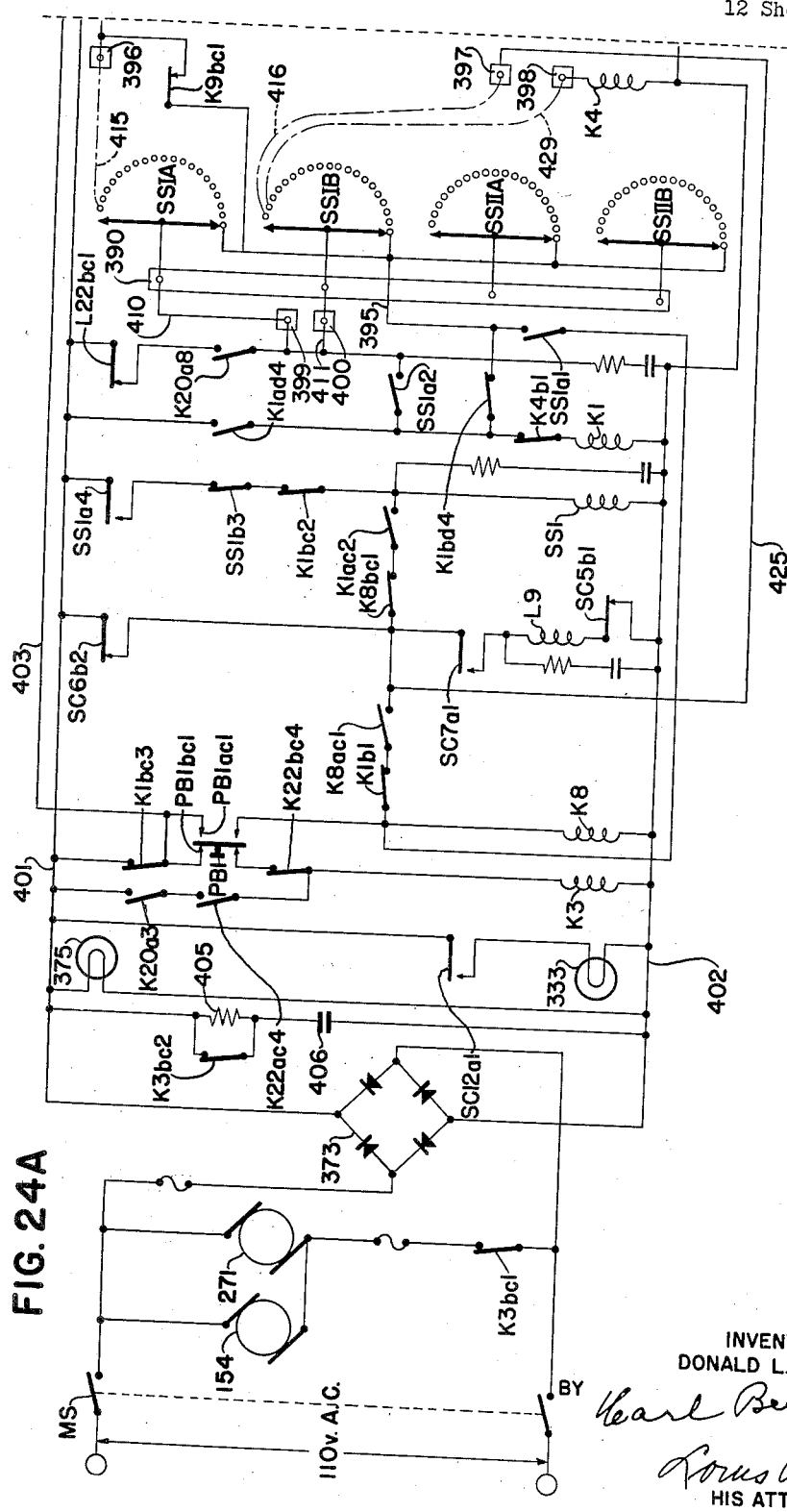

Figs. 24A and 24B together make up a circuit diagram of the apparatus.

GENERAL DESCRIPTION

The novel card-reading apparatus to be described herein is capable of reading a card, column by column in sequence, while the card remains locked in reading position.

In order to bring out its operation more clearly, the reading apparatus will be described in connection with a recorder which punches a tape according to data which is read from the cards. It is to be understood that the reading apparatus is capable of controlling other devices according to the data which is read and is not limited to controlling a tape-punching type of recorder.

The card-reading apparatus 50 and the recorder 51 (Fig. 1) are shown coupled by cables for joint operation. The reading apparatus is provided with a card chute 52, into which cards can be inserted manually one at a time. Card stops in the chute stop the inserted card in reading position, and alining pins are operated to aline the card accurately with the sensing pins of the card-sensing means.

Figure 2:
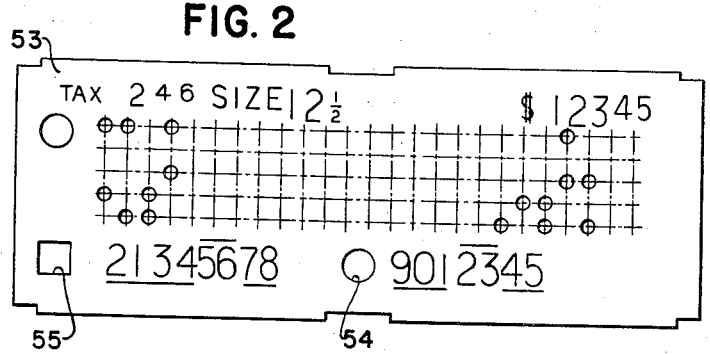
Fig. 2 is an enlarged facsimile showing a typical card which may be read by the card-reading apparatus.

The card 53 (Fig. 2), which is to be read by the reading apparatus of the instant embodiment of the invention, is capable of having twenty-five columns of data perforated therein, with five possible data-representing, or hole, positions in each column. In the card as shown, perforations have been made in columns 1 to 4 and in columns 19 to 23, counting from the left, the perforations having been omitted from columns 5 to 18 in order to simplify the showing of the card. The card is also provided with enlarged openings 54 and 55, through which alining pins pass to properly aline the card with sensing pins and to lock the card in reading position until all the desired data has been read therefrom. If desired, the data which is perforated on the card may also be printed thereon.

A sensing pin is provided for each possible data-representing, or hole, position in the card. In the embodiment being described to illustrate the invention, twenty-five columns of five pins each are provided, because the card 53 (Fig. 2) to be sensed is capable of having data perforations in any of twenty-five columns. The sensing pins are spring-urged to sensing position, but they are held in their retracted position by control means which is cyclically operable to release one column of sensing pins at a time for sensing operation. In the instant embodiment, the columns of sensing pins will be released to sense the columns of the card, beginning at the left of the card.

The sensing pins control contacts which convert the sensed data into electrical signals which cause the recorder to punch the sensed data into a tape.

The utilization of the sensed data—i. e., the punching of the tape—will cause the reading apparatus to cycle and render the next column of sensing pins operable to sense the next column on the card. Hence, the control of the sensing means is made positive and requires that data which has been sensed be utilized before further data is sensed.

Adjustable means are provided for controlling the sensing operation to terminate the sensing of the card after any predetermined number of columns have been sensed.

Means are provided to remove the card stops and to feed the card from sensing position after the required number of columns have been read.

A disabling means is provided to maintain the sensing pins in ineffective position when data is not to be read from certain columns on the card.

The operation of the card-reading apparatus and the interrelation of the card-reading apparatus and the recorder will be clear from the following detailed description.

DETAILED DESCRIPTION
CARD-READING APPARATUS

Figure 1:
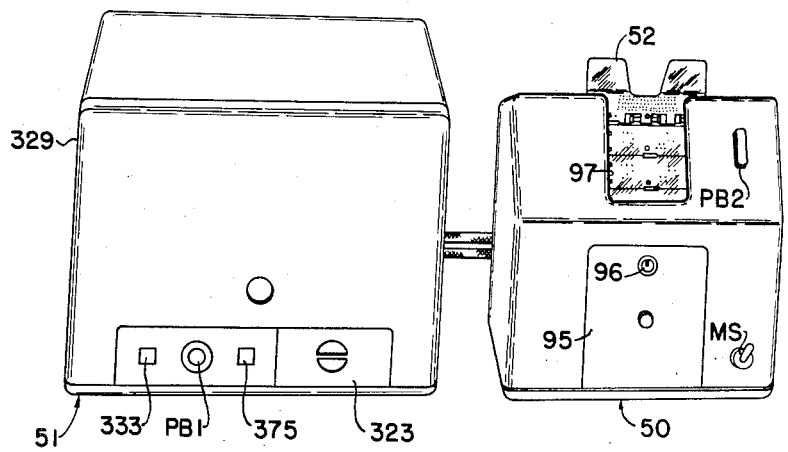
Fig. 1 shows the card-reading apparatus and a recorder controlled thereby to perforate a tape according to the data which is read.

The card-reading apparatus 50 is shown in Figs. 1 and 4 and is operable to read data from the cards or tags inserted therein and to control the recorder 51 to reproduce this data on the tape.

While the card-reading apparatus of the instant embodiment has the capacity for reading up to twenty-five columns on a card, each column of which may have perforations in any of five positions, it will be obvious from the following description that the capacity of the reading apparatus, as to the number of columns and as to the number of positions per column which may be read, is merely exemplary and that the capacity can be varied without departing from the invention.

Card chute

As best shown in Figs. 1, 4, 5, and 8, the card-reading apparatus is provided with a card chute 52 for receiving cards to be read.

This chute 52 is formed by an upper rear guide plate 61, a lower rear guide plate 62, a transparent front cover 63, and a pair of side guides 64 and 65. The upper edges of the guide plate 61 and the front cover 63 are cut away at 66 and 67 in the central portion to enable the cards to be inserted far enough in the chute to insure that they will be in position to be sensed. The upper ends of the guide plate 61, the side guides 64 and 65, and the cover 63 are flared outwardly to form a throat, which facilitates the placing of cards in the chute and guides them into proper position relative to the sensing means.

The upper rear guide plate 61 of the chute is provided with twenty-five columns of holes 70 (Figs. 1, 4, and 5), each column containing five holes, which holes allow the ends of sensing pins 71 to move into the chute and into engagement with the card in reading position. The upper rear plate 61 is also provided with two larger holes 72, through which pass alining pins 73 and 74. These pins have tapered forward ends and cooperate with alining holes in the card to aline the card properly in reading position. The pins 73 and 74 not only pass through the alining holes 54 and 55 in the card to aline it in reading position, but also serve to lock it against removal from reading position until the operation of the reading apparatus has been completed. In a similar manner, the upper portion of the chute cover 63 is provided with twenty-five columns of holes 75 and with two holes 76 in alinement with holes 70 and 72, respectively, to allow the sensing pins, which pass through the holes in the card, to make the full amount of movement necessary to sense the card, and to allow the alining pins to pass completely through the holes 54 and 55 in the card.

The upper rear guide plate 61 is also notched to allow card stops 80 and 81 and a roller 82, which operates the card contacts SC20a1, to extend into the card chute and to allow the card-advancing mechanism to engage the card and move it downwardly after it has been sensed.

The guides 64 and 65 not only form the sides of the chute but also serve to space the chute cover 63 from the guide plate 61 by a distance which is only slightly more than the thickness of a single card, so as to allow only one card to be in sensing position at a time.

The lower rear guide plate 62 carries three pairs of pressure rollers 85, which extend into the chute and are mounted on the plate by means of springs 86. The plate 62 is guided in position to form the lower part of the chute by inwardly-extending flanges 83 and 84 (Figs. 4 and 5) on side guides 64 and 65, respectively, and by bifurcated arms, as 87 (Fig. 4), which extend from its rear face and straddle a sleeve 88 on the shaft 89 to support the plate for movement toward and away from the chute cover 63. A lever 90, which is pivoted on a stud 91 on a bracket 92 secured to a cross bar 93 between the reader side frames, has its upper end connected to the arms 87 and has its lower end connected to a spring 94, which urges the lever 90 counter-clockwise (Fig. 4) to move the plate 62 toward the chute cover 63 until the pressure rollers 85 engage the cover. The tension in the spring 94 is such that the pressure rollers 85 engage the cover with just enough force to hold the cards in position but not enough to prevent the cards from being fed downwardly in the chute.

The lower ends of the chute cover 63 and the lower rear guide plate 62, which together form the lower end of the chute, are curved to guide the cards from the chute into a card drawer 95 (Figs. 1 and 4), which drawer is normally locked by a lock 96 and can only be removed from the card-reading apparatus by an authorized person.

The cabinet of the reader is formed with a sufficiently large opening (Fig. 1) that the card in reading position, as well as the last three cards which were read, can be seen, and printed data thereon can be read from the cards, if desired.

When it is desired to remove the lower three cards from the chute, the lower rear guide plate 62 can be shifted away from the chute cover 63 to allow the cards to drop by gravity through the chute. The plate 62 is shifted by manually rocking the lever 90 clockwise (Fig. 4) after the card drawer has been removed to allow access to the lever.

Sensing means

The sensing means operates to read the data from the card, column by column, while the card remains stationary in reading position in the chute.

As explained earlier, sensing means are provided for sensing up to twenty-five columns on the card, each column of which may contain perforations in any of five positions. Since the sensing means for reading each column on the card is duplicated for each of the twenty-five columns, the sensing means for the various columns will be clear from a description of the sensing means for one of the columns.

The five sensing pins 71, for sensing data in a column of the card, are arranged one above the other and are of similar construction. Each sensing pin 71 is in the form of a Bowden wire which has its forward end terminating in its respective hole 70 in the upper rear guide plate 61 of the card chute and has its rear end connected to an enlarged contact control section 98 of non-conducting material, which section 98 is supported and guided for longitudinal movement in a cross bar 99, which is mounted between reader side frames 100 and 101.

Intermediate its ends, the sensing pin 71 is mounted for longitudinal movement through a front supporting and guiding cross bar 109, mounted between the side frames of the reading apparatus, a sheath 110, and a further supporting cross bar 111, mounted between the side frames, the sheath 110 having its forward end extending into the cross bar 109, its rear end extending into the cross bar 111, and its center portion supported by a plate 112, secured to the cross bar 111.

Each sensing pin 71 is urged to the left (Fig. 4) by its individual spring, as 120, which spring forms part of the contact means which converts the sensed data into electrical signals by which any desired apparatus may be operated according to the data on the card. In the instant example, the recorder can be controlled to duplicate the data on the card.

The contact means is common to the sensing pins for all the columns on the card and is shown most clearly in Figs. 4 and 8. The contact means is mounted between end frames 121 and 122, which are supported in the side frames 100 and 101 of the reading apparatus by means of two cross rods 123 and 124.

Supported between the end plates 121 and 122 are five input buses, 125, 126, 127, 128, and 129, one for each possible perforation in a column, which buses are electrically connected together by a strap 130.

As is clear from Figs. 4 and 8, one end of each of the springs 120 is connected to its related input bus. One spring is secured to each bus for each column on the card; that is, there is a row of twenty-five springs secured to bus 125, each one of which will urge its related sensing pin to the left (Fig. 4) to enable the top row of pins to sense the top row of perforations in the card. Similarly, twenty-five springs will be mounted on each of the four other buses to urge their related sensing pins to the left.

Mounted to the left of each row of springs, and common thereto, is an output bus, the output buses 131, 132, 133, 134, and 135 being related to the top to bottom hole positions, respectively.

The springs 120 have thereon contact portions, which are in position to engage their related output buses to selectively complete circuits from the common input buses to various ones of the output buses. Hence, the springs 120 serve two functions; that is, to supply the force to move the sensing pins to the left, and also to serve as contacts in the circuits controlled by the sensing means.

The five output buses 131, 132, 133, 134, and 135 are connected to the five terminals in a section 136 of a plugboard 137 in the recorder, which terminals can be connected by plugboard connectors to terminals in section 138 of the plugboard to select the punches to be operated according to the data which is read. In order to simplify the circuit diagram, the twenty-five contacts which connect an input bus to an output bus will be shown as a single contact, contacts SC25a1 representing the twenty-five contacts which connect the buses 127 and 133 when a perforation at the bottom of any column is sensed, contacts SC25a2 representing the twenty-five contacts which connect buses 128 and 134, contacts SC25a3 representing the twenty-five contacts which connect the buses 129 and 135, contacts SC25a4 representing the twenty-five contacts which connect buses 126 and 132, and contacts SC25a5 representing the twenty-five contacts which connect buses 125 and 131. Hence, contacts SC25a1, SC25a2, SC25a3, SC25a4, and SC25a5 in Fig. 24B represent the various contacts which can be controlled in the sensing of any column on the card.

In the normal, retracted, position, of the sensing pins, their front ends will be flush with the rear surface of the card chute, and the enlarged rear portions 98, which are notched to receive the springs 120, will hold the springs out of engagement with their related output buses.

As each column of sensing pins is released to sense the card, those sensing pins which are in positions where there are holes in the card will be allowed to move to the left to allow the springs to engage the output buses and complete a circuit from the input bus to the output bus; while those sensing pins which are in positions where there are no perforations will be prevented from moving to the left and will keep their related springs from engaging the output buses.

The movement of the sensing pins from their retracted position to their sensing position is controlled by a series of arms 140 (Figs. 4 and 8), one for each column on the card, which arms are controlled by a disabling yoke 141, which is common to all the arms, and by individual cams 142 of a cam line. The arms are pivotally mounted on a cross rod 143, are urged counter-clockwise (Fig. 4) by individual springs 144, which are connected to rearward extensions 145 of the arms, and are guided laterally by a comb-plate 146, secured to the cross bar 99.

Each arm 140 is formed with a cam-engaging projection 147 and with an upwardly-extending finger 148, which engages the enlarged portions 98 of the five sensing pins for its related column. The finger 148 of the arm 140 extends along one side of the sensing pins of the column, as seen most clearly in Figs. 4 and 8, and a similar finger 149, which is secured to the arm 140, extends along the other side of the sensing pins to insure that the arm 140 will always remain in controlling position relative to the sensing pins.

The disabling yoke 141 normally extends across all the rearward extensions 145 of the arms and rocks the arms 140 clockwise to maintain the sensing pins in their right-hand positions. The yoke is rocked away from the arms at the beginning of the operation of the reading aparatus to free the arms 140 to the control of the cams 142 on the cam line.

The cam line (Figs. 4, 6, 7, 15, and 16) contains twenty-eight cams, twenty-five cams 142 for controlling the operation of the sensing means, and three cams, 150, 151, and 152, for providing additional controls for the reading apparatus, which cams are secured to a shaft 153 journaled in the side frames 100 and 101 of the reading apparatus.

A driving motor 154, operating through a shaft 155 (Figs. 4 and 15), a clutch 156, and gears 157, 158, 159, 160, 161, and 162, drives the cam line through one twenty-eighth of a revolution clockwise (Fig. 4) each time the clutch 156, which is a single-revolution clutch, is tripped. Hence, the clutch 156 will be tripped twenty-eight times for each complete operation of the reading apparatus.

The cams 142 are formed with a notch 165 of such a length as to be opposite the projection 147 on its related arm 140 only in one of the positions of the cam line and are so proportioned that, while the projection 147 is riding on the periphery of the cam, the arm will be in position to maintain the sensing pins ineffective, but, when the notch 165 is opposite the projection 147, the arm can rock counter-clockwise to move the fingers 148 and 149 to the left to free the sensing pins for movement to the left to sense the perforations of its related column and close the required ones of the contacts SC25a1 to SC25a5.

In order to prevent arcing at the contacts SC25a1 to SC25a5 when they are opened and closed under control of the sensing means, contacts SC24a1 are provided, which contacts close after the contacts SC25a1 to SC25a5 have been closed under control of the sensing means and open before the contacts SC25a1 to SC25a5 open. The contacts SC24a1 are controlled by a cam 164 on the clutch 156, which closes the contacts at 285 degrees and opens the contacts at 345 degrees in the revolution of the clutch.

The notches 165 on the cams 142 are arranged spirally about the shaft 153, so that in each of the first twenty-five positions of the cam line a different arm 140 will be allowed to operate to free its related sensing pins. In the instant embodiment, when the clutch 156 is tripped for the first time in a card-reading operation, the first column at the left of the card will be sensed; when the clutch is tripped the second time in the card-reading operation, the second column from the left of the card will be sensed; and, as the clutch is tripped further in the reading operation, the other columns will be read from left to right.

While, in the instant embodiment, the notches 165 are so arranged about the shaft 153 that the card is read column by column from left to right, it is obvious that, by properly locating the notches on the various cams, the columns on the tag can be read in any sequence which may be desired.

The reader can be controlled to read all twenty-five columns on the card or any desired number of columns. This control is effected by the "end-of-card" cam 150 on the cam line. Cam 150 is formed with a projection 166 and is so adjustable about the cam line to position the projection 166 relatively to the cam line position that, after any desired number of operations in reading a card, the projection will rock a related lever 167 about the cross rod 143 to close contacts SC23a1 and control the operation of the reading apparatus to inhibit further reading from the card. The manner in which contacts SC23a1 effect their control will be explained fully when the circuit diagram is described.

The adjustment of the cam 150 to desired positions about the cam line is obtained by securing it to the cam 151 by set screws 168 and 169, which may be screwed into the proper ones of a series of threaded openings 170 around the cam 151. As shown in Fig. 7, the cam 150 is set to terminate reading after twenty-three columns have been read.

The cam 151 has thereon a projection 171, which will rock its related lever 172 about the cross rod 143 to open contacts SC22a2 and allow contacts SC22b1 to close when the cam line is in position twenty-eight, or home position.

The remaining control cam 152 has thereon a projection which will rock its related lever 173 about the cross rod 143 to open contacts SC21b1 in position twenty-seven of the cam line.

The manner in which contacts SC22a2, SC22b1, and SC21b1 are utilized to control the operation of the reader and the recorder will be explained when the circuit diagram is described.

Motor bar

Figure 17:
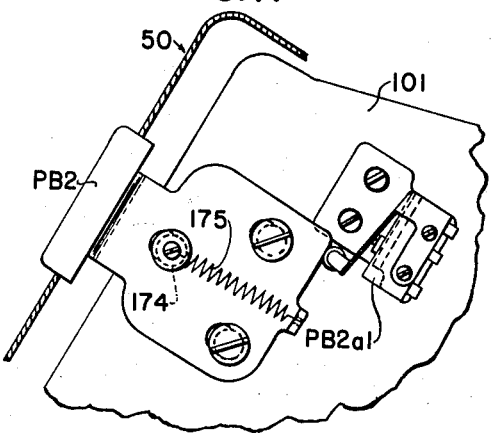
Fig. 17 is a detail of the motor bar of the reading apparatus and the contacts controlled thereby.

A motor bar PB2 (Figs. 1 and 17) is provided to initiate an operation of the reading apparatus. The motor bar PB2 is formed with slots which cooperate with three studs 174 on the side frame to guide the motor bar when it is operated. A spring 175, connected between one of the lugs 174 and an ear on the bottom of the motor bar, restores the motor bar to undepressed position. When the motor bar PB2 is operated, it will close contacts PB2a1 to initiate an operation of the reading apparatus if a card is properly in reading position. Two means are provided to test whether the card is at the reading position in the chute and whether the card is properly in position in the chute.

Card contacts

One of the testing means for testing whether the card is properly in the chute includes card contacts SC20a1, which are closed only if the card is in reading position. As shown in Figs. 5 and 12, the roller 82, which is mounted on an arm 180, pivoted on a bracket 181, secured to the cross bar 109, extends into the card chute in such a way that the insertion of a card into the chute will rock the arm 180 clockwise (Fig. 12) to close contacts SC20a1.

Card-alining means

The other of the testing means for testing whether the card is properly positioned in the chute utilizes the alining pins 73 and 74. If the card is inserted improperly into the chute, so that the locating and alining holes 54 and 55 in the card are not opposite the alining pins 73 and 74, the pins will be blocked against movement. The operating means for the alining pins is a rotary type of solenoid L20, which is adjustably mounted on a bracket 182, secured to the side frame 101 (Figs. 8 and 10). A stud 183 on the armature 184 extends into a slot in the lower end of a lever 185, pivoted on a stud 179 on the side frame 101. A stud 186 in the upper end of the lever 185 works in a slot in the lower end of a further lever 187, pivoted on the shaft 89. The upper part of the lever 187 is yieldably coupled to an arm 189, pivotally mounted on the shaft 89, the coupling including a spring 190, which urges the arm and the lever in opposite directions until a stud 191 on the arm engages the edge of the lever. The arm 189 is connected by the sleeve 88 to arms 193 and 194, which operate alining pins 74 and 73, respectively. The upper part of the lever 187 is urged to the right (Fig. 10) by a spring 188 and, through the arm 189 and the sleeve 88, rocks the arms 193 and 194 clockwise about the shaft 89 until a projection on the rear edge of the arm 194 engages a stop 195 (Figs. 8 and 14) on a bracket 196.

When the motor bar PB2 has closed contacts PB2a1, and the card has closed contacts SC20a1, the solenoid L20 will be energized to rotate its armature counter-clockwise (Fig. 10), and the levers 185 and 187 will operate, through the yieldable connection with arm 189, to drive the arms 193 and 194 counterclockwise (Figs. 4, 10, and 14) about the shaft 89 to move the alining pins 73 and 74 through the alining holes 54 and 55 in the card if the card is properly positioned.

The arm 194 can be rocked counter-clockwise only if the card is in proper position and the alining pins can pass through the alining holes 54 and 55 in the card, and this counter-clockwise movement of the arm 194 is used to close contacts L20a1 and L20ac2 and open contacts L20bc2. The upper end of the arm 194 is enlarged to form an extension 197 and is notched to receive a stud 198 in a link 199, which is pivotally connected to a contact-operating lever 200, pivoted on a contact-supporting bracket 201. The extension 197 lies between the link 199 and a plate 202, which is secured to the link by the stud 198 and by another stud and retains the link 199 in operating engagement with the extension 197. The stud 198 is so located with respect to the extension 197 that the link 199 will not be moved to the left (Figs. 10 and 14) to close contacts L20a1 and L20ac2 and open contacts L20bc2 unless the alining pins have been moved through the alining openings in the card.

If the card is improperly positioned, then the forward movement of the pins 73 and 74 will be blocked, causing the coupling between the lever 187 and the arm 189 to yield, and the contacts L20a1, L20ac2 will remain open and the contacts L20bc2 will remain closed. Under these circumstances, the operation of the reading apparatus will not be started, and the solenoid L20 will be de-energized immediately when the motor bar is released, thereby allowing the card to be removed in order that it might be properly inserted into the chute.

The manner in which the contacts L20a1, L20ac2, and L20bc2 exert their controls will be explained fully when the circuit diagram is explained.

*Disabling yoke*

Figure 18:
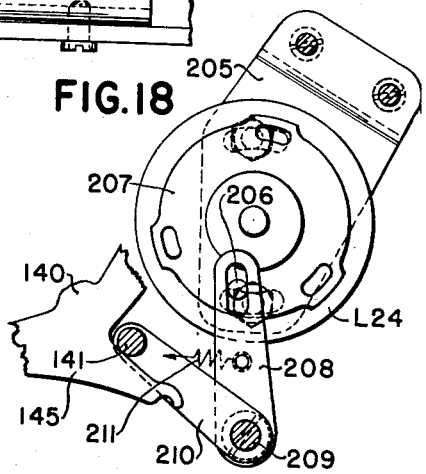
Fig. 18 is a detail of the operating means for the disabling yoke, which can be rendered operable to disable the sensing means.

When the card-reading apparatus is set into operation, the disabling yoke 141 (Figs. 4 and 18) is immediately moved away from the extensions 145 on the arms 140 by means of a rotary-type solenoid L24 (Figs. 8 and 18), which is adjustably mounted on a bracket 205, secured to the side frame 100. A stud 206 on the armature 207 of the solenoid works in a slot in an arm 208, secured to a shaft 209, journaled in the side frames 100 and 101. Also secured to the shaft 209 are a pair of arms 210 (only one shown), which support the disabling yoke 141. A spring 211, which is connected to the arm 208, urges the shaft 209 counter-clockwise (Fig. 18) to force the yoke 141 against the extensions to maintain the arms 140 in their sensing-pin-retracting positions. When the solenoid L24 is energized, it will rock its armature 207 counter-clockwise (Fig. 18) to move the disabling yoke 141 away from the extensions 145 and free the arms 140 to the control of the cams 142.

*Card Stops*

As explained earlier, the card is inserted into the chute until it is stopped in proper position by a pair of card stops 80 and 81 (Figs. 5, 8, and 13). Near the end of a card-reading operation, it is necessary to withdraw the stops in order that the card may be moved from card-reading position. As is most clearly shown in Fig. 8, the stops 80 and 81 are in the form of bell cranks pivoted on the cross bar 109. One arm of the bell crank 81 projects into the card chute and acts as the stop, and the other arm is formed with an oblique slot, which engages a stud 215 in the end of an arm 216, pinned to the shaft 89. Similarly, the bell crank 80 is formed with an oblique slot, which cooperates with a stud 217 in an arm 218, which also is pinned to the shaft 89. An operating arm 219, which also is pinned to the shaft 89, has a slot cooperating with a pin on an armature of a rotary-type solenoid L22, mounted on a bracket 220, secured to the cross bar 93, which is carried by the side frames 100 and 101. A spring 222 urges the arm 219, the shaft 89, and the arms 216 and 218 to move the stops into blocking position in the chute. When the solenoid L22 is energized, it will rock the shaft 89 clockwise (Fig. 13) to move the studs 215 and 217 to the rear of the slots to rock the bell cranks to remove the stops from the chute.

The arm 216 has a flange 223, which engages a switch 224 to open contacts L22bc1 and close contacts L22ac1 when the stops have been completely withdrawn from the chute.

*Card-advancing means*

Near the end of the card-reading operation, and after the stops have been withdrawn, a card-advancing means operates to feed the card out of reading position in the chute. The feeding of the card from reading position pushes the lower cards downwardly in the chute and causes the lowest one to be forced out of the chute and into the locked card drawer. The card-advancing means, which is operated by a rotary solenoid L21, is shown in Figs. 4, 9, and 11.

Two arms, 225 and 226, are secured to a shaft 227, journaled in the side frames 100 and 101. A feed-pawl-supporting yoke, having a spacer plate 228 and two down-turned side flanges 229 and 230, is mounted between the arms 225 and 226 for movement longitudinally of the arms, the mounting being effected by studs 231, 232, 233, and 234 on the flanges 229 and 230, which work in slots, as 235 (Figs. 4 and 11), in the arms. A spring 236, connected between a lateral extension 237 of the arm 225 and a stud on the spacer plate 228, urges the feed-pawl-supporting yoke to the left, as seen in Figs. 4 and 11.

The flanges 229 and 230 have a shaft 240 journaled therein, which shaft has secured thereto a pair of toothed feed pawls 241 and 242, which can cooperate with a card to feed it from reading position. The pawls have tails 243 and 244, which engage stop studs 245 and 246 in the flanges 229 and 230 to limit the clockwise movement (Fig. 11) of the pawls. A spring 247, connected between the pawl 241 and the stop 245, urges the tails to engage the stops. A pair of spacer rollers 248 and 249, loose on the shaft 240, cooperate with the chute cover 63 to determine the longitudinal movement of the yoke in the return movement of the card-advancing means. In the normal position of the yoke on the arms 225 and 226, the rollers 248 and 249 and the pawls 241 and 242 will be spaced a slight distance away from the cover 63 to allow the card to be inserted freely into the chute.

An arm 253, secured to the shaft 227, has the upper end of a link 254 pivoted thereto. The lower end of the link 254 is provided with a slot 255, which cooperates with a stud 256 to guide the lower end of the link. A spring 257 urges the link 254 upwardly to locate the card-advancing means in its normal, or home, position, as shown in Figs. 4 and 11.

The operating solenoid L21 for the card-advancing means is of the rotary type and is mounted on a bracket 260 (Figs. 8 and 11) secured to the side frame 100. A stud 261 on the armature 262 of the solenoid works in a slot in an arm 263, pinned to the shaft 227, to cause the shaft to be rocked counter-clockwise (Fig. 11) each time the solenoid is energized.

When the shaft 227 is thus rocked counter-clockwise, the feed pawls 241 and 242 will be moved downwardly, and, since they are prevented from moving clockwise by the studs 245 and 246, their teeth will bite into the card and carry the card downwardly in the chute to move it out of reading position.

Near the end of the downward movement of the feed pawls, the link 254 will engage a roller 264 to operate a contact-operating lever 265 to open contacts L21b1. The control exerted by contacts L21b1 will be explained fully when the circuit diagram is explained.

Upon the deenergization of the solenoid L21, the spring 257 will return the various parts of the card-advancing means to home position, and, in their return movement, the pawls 241 and 242 can rock counter-clockwise to allow the rollers 248 and 249 to control the position of the yoke on the arms 225 and 226 during the restoring movement of the card-advancing means.

Clutch

The clutch 156, which couples the motor 154 to the cam line to move the cam line through one twenty-eighth of a revolution, is tripped by a clutch solenoid L23 (Figs. 15 and 16), which, when energized, removes a blocking member 266 from in front of a tooth 267 on the clutch to allow the clutch to make a single revolution. The circuits for energizing the solenoid L23 will be fully described when the circuit diagram is described.

This use of the single-revolution clutch and the recycling of the reading apparatus under control of the utilizing device, or "answer-back" system of control, insures that the reading will stop if the read data is not utilized. If the "answer-back" system is not desired, then the shaft 153 can be driven continuously through its twenty-eight positions, and data will be read and sent from the reading apparatus automatically at intervals as determined by the speed of the shaft 153, which in turn is determined by the acceptance rate of the apparatus which is to utilize the read data.

A suitable chamber is provided in the reading apparatus for housing control relay K20 and reset relay K22, which are provided to coordinate the operation of the reading apparatus and the recorder. Also provided in the reading apparatus are suitable receptacles for receiving plugs on the ends of the cables which connect the reading apparatus and the recorder for joint operation.

The operation of the various components of the reading apparatus and the relation and the intercontrols between the reading apparatus and the recorder will be made clear when an operation of the recorder to record the various data of a transaction read from a card is explained in connection with a description of the circuit diagram.

Recorder

The recorder which is used to illustrate how the output from the reading apparatus may be utilized is shown in Figs. 1 and 19 to 23 and is operable to punch the tape with data under control of program control means in the recorder, and under control of the reading apparatus. The recorder can in turn control the operation of the reading apparatus, so that it can exert its controls at the proper time. Inter-controls between the recorder and the reading apparatus prevent the sending of further data to the recorder if the recorder has not recorded data previously sent thereto.

Figure 19:
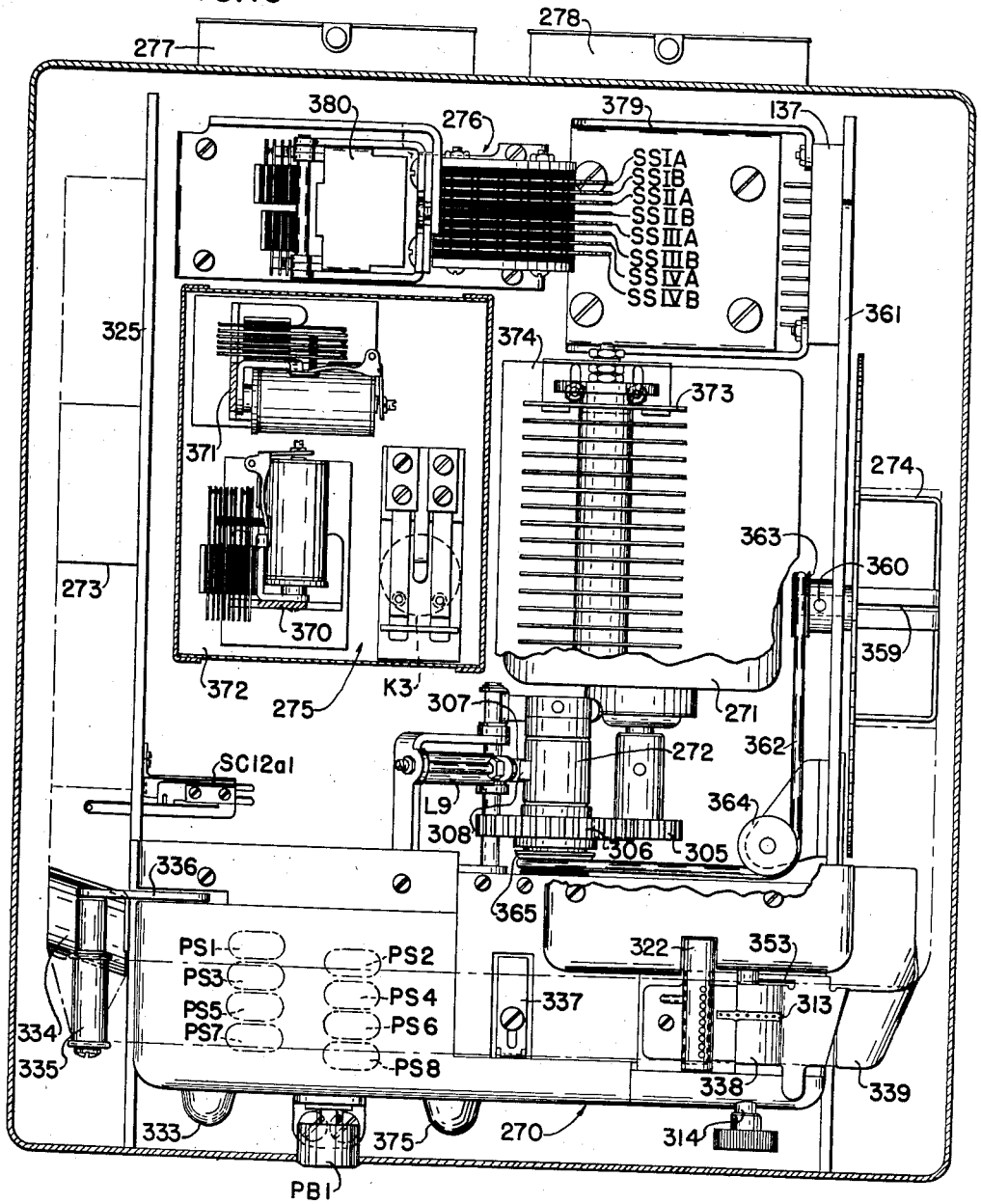
Fig. 19 is a top plan view of the recorder with the cabinet removed and with the wiring and certain parts of the recorder omitted in order that other parts may be seen more clearly.

As shown most clearly in Fig. 19, the recorder includes a punching mechanism 270; a motor 271, for driving the punching mechanism; a clutch 272, for connecting the motor to the punching mechanism; a tape-supporting arbor 273, on which a supply of tape can be mounted; a take-up reel 274, on which the punched tape can be wound as it is punched; a control relay section 275, which houses control relays used to coordinate the operation of the card-reading apparatus and the recorder; and a programming means 276, including a stepping switch and plugboard for providing the various programs or punching sequences which may be desire in the recording of data in proper sequence on the tape.

The recorder is provided with two receptacles, 277 and 278, in which plug connectors on cables which connect the recorder to the reading apparatus can be inserted.

A leader advance push button PB1, which is provided at the front of the recorder, is effective, when operated, to cause the recorder to operate and perforate the tape with the leader advance pattern of perforations. The manner in which the leader advance push button PB1 controls the operation of the recorder will be fully explained when the circuit diagram of Figs. 24A and 24B is described.

Punching mechanism

Figure 20:
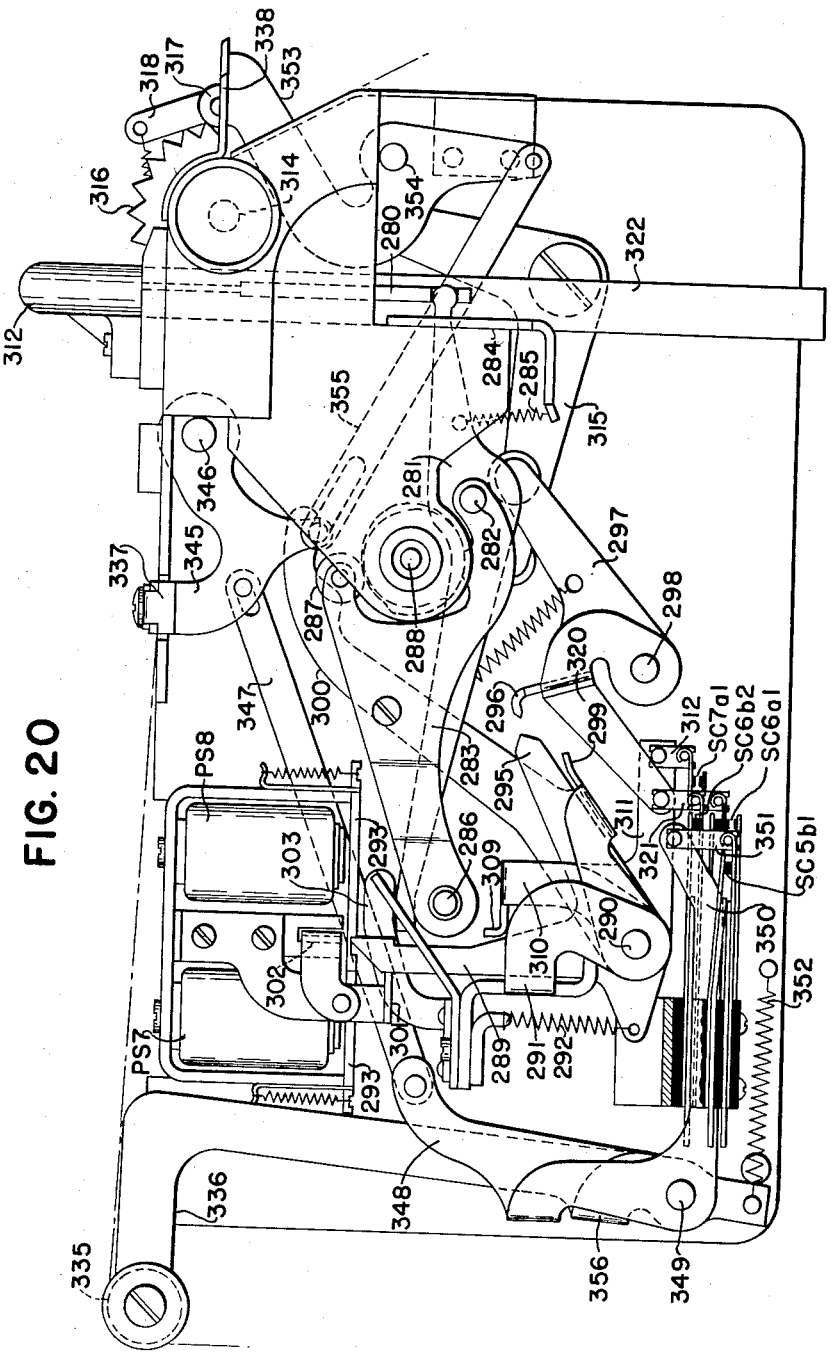
Fig. 20 is a side elevation of the punching mechanism used in the recorder.

The punching mechanism, which is shown in Figs. 19 and 20, is a tape-punching mechanism of the type shown in the patent to Francis E. Hamilton et al., No. 2,540,029.

The punching mechanism includes nine punches 280 for punching the rows of perforations across the tape, one for each of the eight channels on the tape, which are used in combinations to encode data, and one for punching the feed holes.

Figure 3:
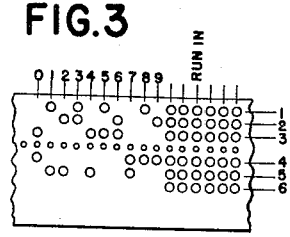
Fig. 3 represents a portion of the tape produced in the recorder and shows the code used to represent data and symbols.
Figure 15:
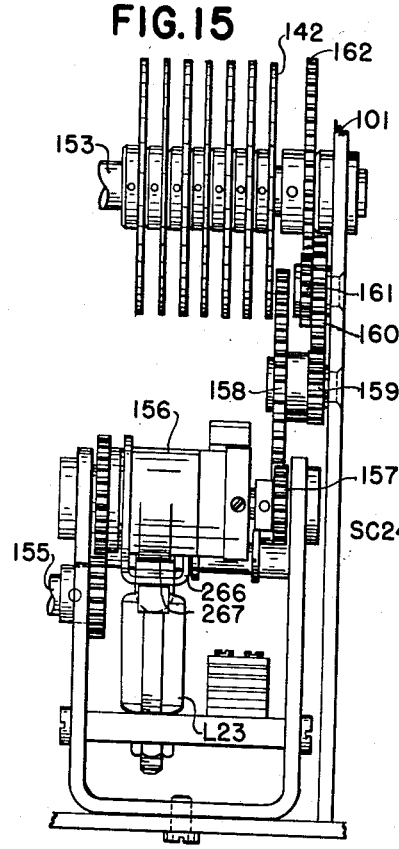
Fig. 15 is a front view of the driving means for the card-reading apparatus, showing in particular the clutch and the clutch solenoid for controlling the cycling of the reading apparatus.
Figure 16:
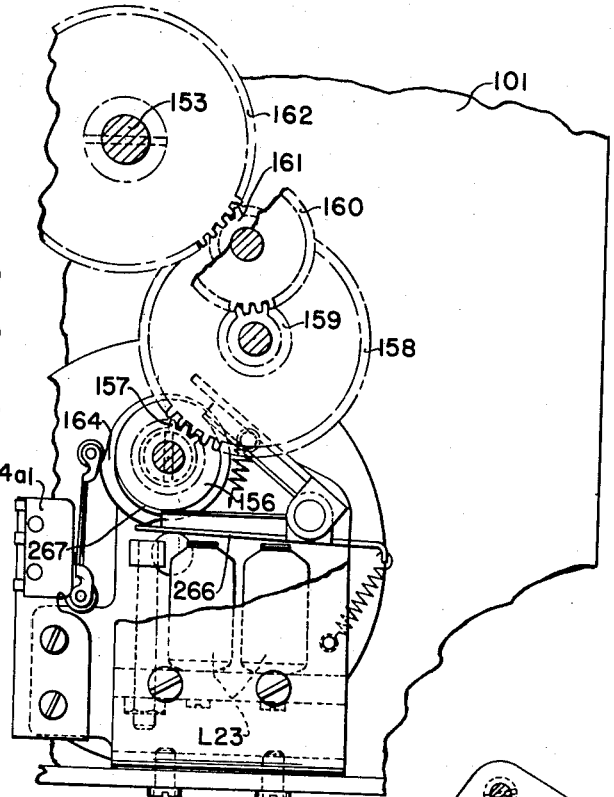
Fig. 16 is a side view of the driving means for the reading apparatus.

Fig. 3 shows a fragment of the tape in which the digits "0" to "9" have been perforated and in which a leader advance portion has been punched.

As explained earlier, the symbols and numbers above the tape in Fig. 3 correspond to the data punched on the tape, and the numbers at the side of the tape identify the channels across the tape.

Each operation of the punching apparatus, whether punching data or a leader advance pattern on the tape, causes a feed hole to be perforated in the tape. These feed holes assist in feeding the tape through the punching apparatus and also through the sensing means which analyzes the tape.

The manner in which the punches are selected and operated will now be explained with reference to Fig. 20. Each punch 280 is pivotally connected to the right end of an actuating lever 281, which is pivoted intermediate its ends on a rod 282 in an actuating frame 283. The right ends of the levers 281 are guided in a comb plate 284 and are urged downwardly by springs 285.

The actuating frame 283 is pivoted at 286 and has rollers 287, which engage cams on a cam shaft 288 to rock the actuating frame 283 counterclockwise from home position and then back to home position to raise and lower the rod 282, upon which the actuating levers 281 are pivoted.

The effectiveness of the actuating levers to operate the punches is controlled by a plurality of magnetically-controlled punch-selecting levers 289, which are pivoted on a rod 290, carried by a bracket 291, and which are urged clockwise by springs 292. The selecting levers 289 are normally retained in their retracted, or non-effective, position, as shown in Fig. 20, by notches in the armatures 293 of punch-selecting magnets PS1 to PS8. When the lever is in its retracted position, it is out of engagement with the left end of the actuating lever 281, and this end is free to rise when the frame 283 raises the rod 282, causing the actuating lever 281 to pivot about its right end, the right end of the actuating lever being loaded by the spring 285. In this operation, the punch 280 will not be operated to punch the tape.

When a punch-selecting magnet PS1 to PS8 is energized, it moves its armature 293 away from the punch-selecting lever 289, freeing the lever 289 for clockwise movement by the spring 292 until the end of the selecting lever engages over the left end of the actuating lever 281 to prevent the left end from rising when the actuating frame 283 raises the rod 282. Since the left end of the actuating lever is positively held by the punch-selecting lever against upward movement, the spring 285 will yield when the frame 283 is rocked, and the right end of the actuating lever 281 and the punch 280 will be forced upwardly to perforate the tape. One or more punch-selecting magnets may be energized in each punching operation according to the encoding of data being punched.

Each of the selecting levers 289 has a forwardly-extending portion 295, with which a locking plate 296 can engage. The plate 296 is carried by a lever 297 which is pivoted on a rod 298 and is operated by a cam on the shaft 288 to lock the levers from 90 degrees to 230 degrees of the operation of the cam shaft 288, the actual punching portion of the operation of the punching mechanism. When operated, the plate 296 engages the forwardly-extending portions 295 of the selecting levers to lock those levers in normal position which have not been released by the punch selector magnets and lock those levers in moved position which have been released to select their related punches for operation.

The forwardly-extending portions 295 of those levers which have been released and have rocked downwardly will engage a restoring plate 299. The plate 299 is pivoted on the rod 290 and is rocked counter-clockwise by a cam-actuated arm 300 near the end of the punch operation. In order to insure that the selecting levers will be properly restored to the control of the punch-selecting magnets PS1 to PS8, the restoring plate 299 provides a slight overthrow movement to the levers, and one of the levers engages a flange 301 on one arm of a bail 302 to rock the bail clockwise, which bail forces all the armatures away from the magnets and into engaging relation with the selecting levers.

Since a feed hole is punched in each operation of the machine, regardless of the selection of punches by the magnets, the punch-actuating lever for the feed hole punch has its left end blocked against upward movement at all times. An arm 303, which is secured to the bracket 291, extends over the end of the actuating lever to cause the lever to force the punch upwardly in each operation of the punching apparatus.

The driving means for the punching mechanism is shown in Fig. 19. The motor 271, which is constantly rotating whenever the recorder is operable, is connected by gears 305 and 306 to the input of clutch 272, which, when tripped, will connect the drive to the cam shaft 288 of the punching mechanism to cause the cam shaft to make one revolution. A punch clutch trip magnet L9 is provided and, when energized, will remove a block 307 from a projection 308 on the clutch to allow the clutch to operate to drive the punching mechanism.

The punch clutch trip magnet L9 is energized each time one or more of the punch-selecting levers 289 is released. A bail 309 (Fig. 20) extends across the selecting levers 289 and is carried by a pair of arms 310 pivoted on the rod 290. One of the arms is formed with an extension 311, which is connected by a link to operate contacts SC7a1. When any one of the punch-selecting levers 289 is rocked, upon its release by its related armature 293, it will rock the bail clockwise to close the contacts SC7a1. This will energize the clutch trip magnet L9 to render the clutch effective to connect the motor to the cam shaft 288 to drive it through one revolution.

A tape-feeding pin-wheel 313 (Fig. 19) is mounted on a shaft 314 (Fig. 20) and has, in its periphery, pins which engage the feed holes in the tape to advance the tape after it is punched, the pin-wheel being driven by a pawl-and-ratchet drive from a lever 315 (Fig. 20), which is rocked by a cam on the cam shaft 288. A detent wheel 316, also mounted on the shaft 314, cooperates with a roller 317 on a lever 318 to accurately position the pin-wheel 313.

An extension 320 on the locking-plate-actuating lever 297 is connected by a link 321 to the contacts SC6b2 and SC6a1. At 90 degrees in the operation of the punching mechanism, when the locking plate 296 is rocked to lock the selecting levers 289 in position, contacts SC6b2 will be opened, and contacts SC6a1 will be closed. These contacts will remain in this condition until 230 degrees of the operation of the punching mechanism, when the lever 297 is rocked to unlock the punch-selecting levers, at which time contacts SC6b2 will be closed, and contacts SC6a1 will be opened. The controls exerted by contacts SC6a1 and SC6b2 will be explained fully when the circuit diagram of Figs. 24A and 24B is explained.

The particles of tape which are removed from the tape as perforations are made are guided by a chute 322 to a drawer 323 (Fig. 1), which can readily be removed from the recorder.

*Tape-handling means*

Figure 22:
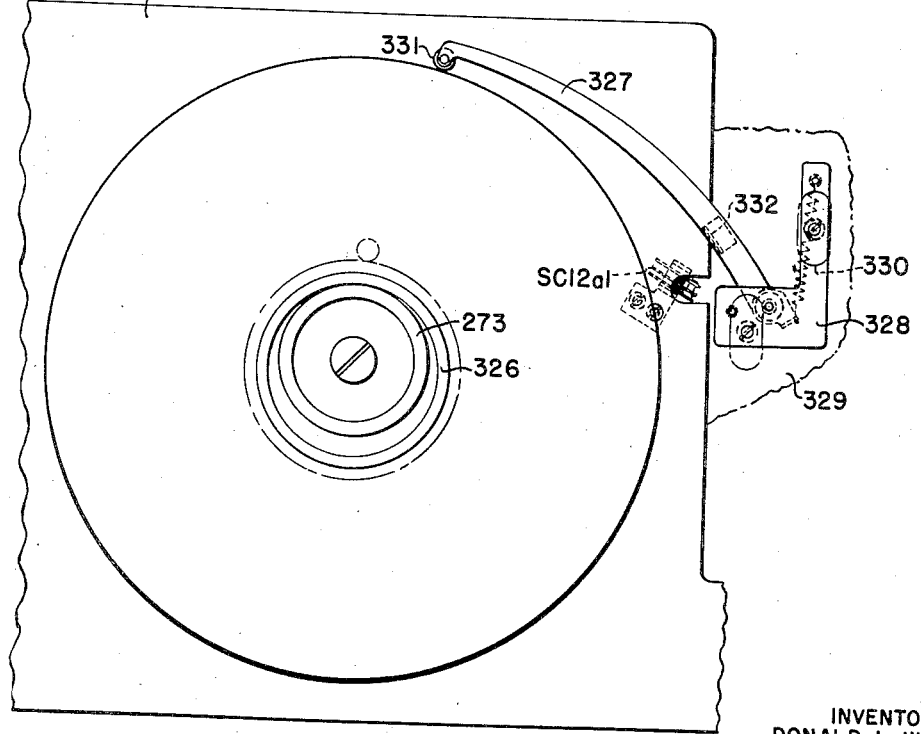
Fig. 22 is a side elevation of the tape supply means and the warning means for causing a signal to indicate when the tape supply is low.

The various means for handling the tape in the recorder are seen in Figs. 19, 20, and 22.

The tape-supporting arbor 273 is secured to a side frame 325 of the recorder and is smaller than the inside diameter of the core 326 of a roll of tape. Since the arbor 273 does not rotate, the friction between it and the inside of the core provides enough drag on the tape to maintain the proper tension on the tape as it is supplied to the punching mechanism.

A lever 327 (Fig. 22), pivoted on a bracket 328, secured to the cabinet 329 of the recorder, is urged counter-clockwise (Fig. 22) by a spring 330 to maintain a roller 331 on the end of the lever 327 in contact with the roll of tape on the arbor. The roller 331 will descend as the diameter of the roll of tape on the core decreases, allowing the lever 327 to rock counter-clockwise until, when the roller 331 reaches the position shown in dot-and-dash lines, a bracket 332 on the lever closes the contacts SC12a1, which are mounted on the side frame 325. Contacts SC12a1 close a circuit to red signal light 333 on the recorder, to provide a warning signal to the operator to indicate that the tape supply is low.

The tape is guided from the bottom of the supply roll, under a guide plate 334 (Fig. 19), over a roller 335 on a tension control lever 336, under a tape feeler 337, through the punching section of the punching mechanism, over the pin-wheel 313, and under a cooperating pressure plate 338, around a guide 339 to the take-up reel 274.

The tension control arm 336, the tape feeler 337, and the pressure plate 338 cooperate to open contacts SC5b1 in the circuit to the punch clutch trip magnet L9 to prevent an operation of the punching mechanism under the following conditions, which would contribute to an improper punching of the tape.

The tape feeler 337 is carried by an arm 345, which is pivoted on a stud 346. With a supply of tape in the punching mechanism, the feeler 337 will be supported by the tape; but, as soon as the tape breaks or the end of the tape passes the feeler, the feeler will drop downwardly and rock the arm 345 counter-clockwise (Fig. 20) about the stud 346. A link 347 connects the arm 345 to an arm 348 of a yoke pivoted on a stud 349, the other arm, 350, of which yoke is connected by a link 351 to the contacts SC5b1. A spring 352 normally urges the yoke counter-clockwise to maintain the contacts SC5b1 closed. When the arm 345 rocks counter-clockwise, it will pull the link to the right (Fig. 20) and will rock the yoke clockwise to open the contacts SC5b1.

The contacts SC5b1 are also opened when the pressure plate 338 is moved away from the pin-wheel 313. The pressure plate 338 is mounted on a lever 353, pivoted on a stud 354. A link 355 is connected to the lever 353 and has a pin-and-slot connection with the arm 345, so that, whenever the lever 353 is rocked to move the pressure plate away from the pin-wheel, the link 355 will rock the arm 345 clockwise to raise the feeler 337 above the tape. The clockwise rocking of the arm 345 will pull the link 347 to the right and rock the yoke to open the contacts SC5b1.

A further control of the contacts SC5b1 prevents punching if there is too much tension on the tape and improper punching would result. The roller 335 is supported at the upper end of the lever 336, which is pivoted on the stud 349 and is formed at its lower end with a yoke 356, which straddles the arm 348. If the feeding of the tape from the storage reel becomes blocked and the feeding of the tape by the pin-wheel 313 continues, the tension on the tape will be increased and will shift the roller 335 to the right (Figs. 19 and 20), rocking the lever 336 clockwise. The yoke 356 will rock the arm 348 and its connecting arm 350 clockwise to open the contacts SC5b1. As soon as the tension has been relieved, the spring 352 will return the arms 350, 348, and 336 to their normal position and will allow contacts SC5b1 to reclose.

After the tape has been punched, it passes around the guide plate 339 and around the under side of the take-up reel 274, which reel is slotted at 359 to receive the end of the tape. The take-up reel is mounted on a shaft 360 journaled in the recorder side frame 361 and is yieldably driven by a belt 362, which runs over a pulley 363 on the shaft 360, over a pair of guide pulleys 364, and over a driving pulley 365 on the punching mechanism cam shaft 288 and gives the reel an increment of movement each time the punching mechanism operates. The tension in the belt 362 is such that the take-up reel will be driven with enough force to take up the tape as it is punched but will not apply sufficient force to the tape to pull the tape improperly through the punching mechanism.

The tape, therefore, will be pulled from the supply roll as needed by the punching mechanism and will be wound on the reel 274 as it is punched.

Control relay section

The control relay section 275 houses the relay K3, and also houses several relay racks 370 and 371, which support the control relays K1, K4, K8, and K9, which are shown in the circuit diagram, Figs. 24A and 24B. A shielding dust cover 372 surrounds the relays of the relay section.

The D. C. operating power for the control circuits, including the relays K1, K4, K8, K9, K20, and K22, is obtained from the rectifier 373, which is mounted on a supporting platform 374 above the motor 271.

Whenever operating power is supplied properly to the control circuits, a green light 375 on the front of the recorder is lighted to indicate to the operator that the apparatus is in operating condition.

Programming means

Figure 21:
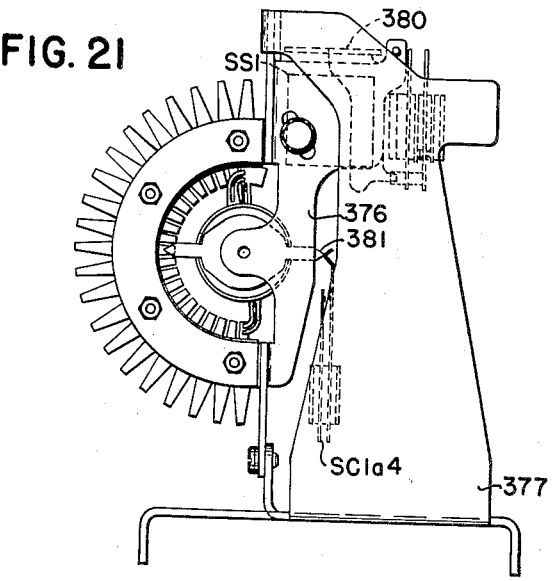
Fig. 21 is a side elevation of the stepping switch used to provide the controls in the various punching programs which it is possible to carry out with the recorder.
Figure 23:
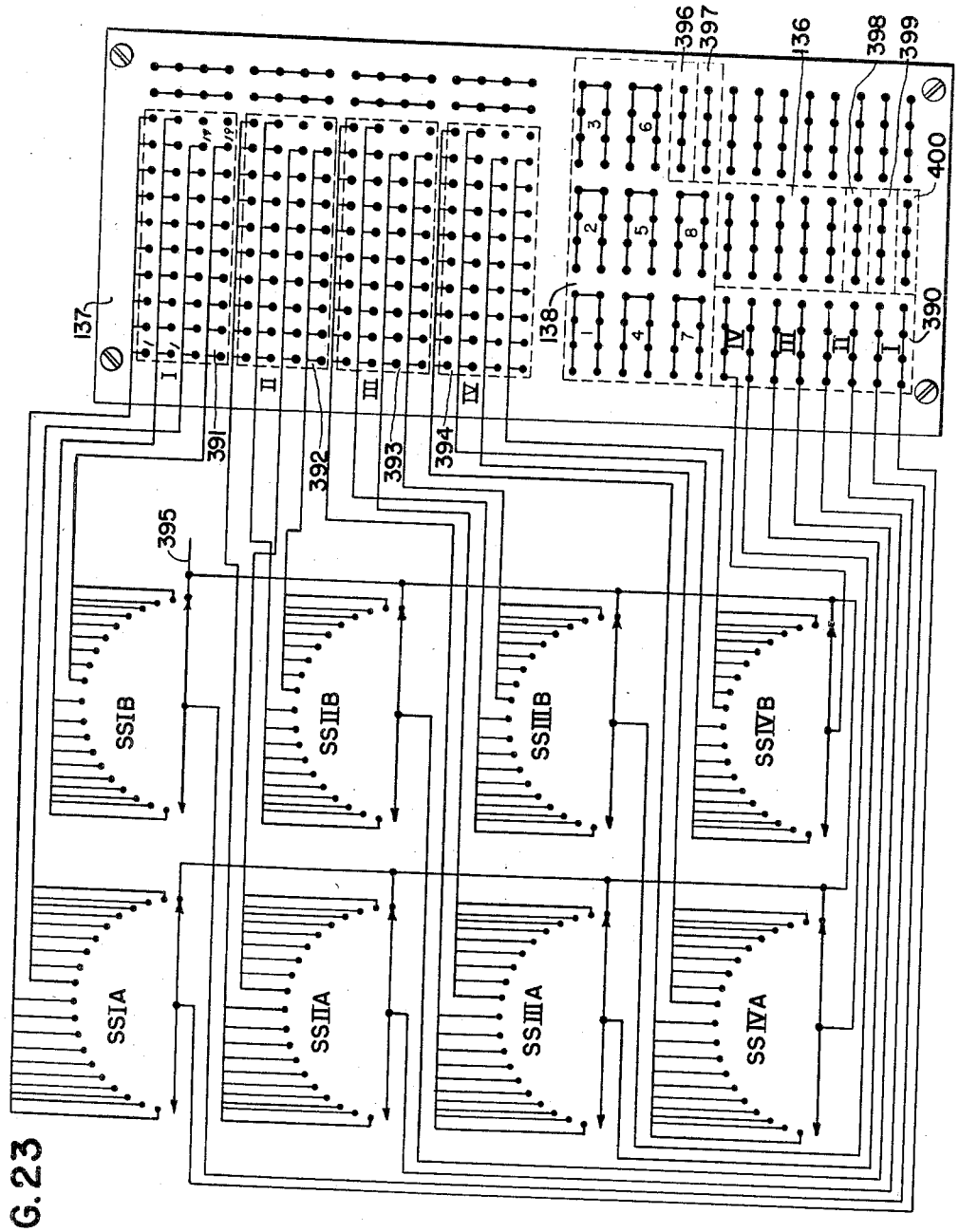
Fig. 23 is a schematic wiring diagram showing the connections between the various levels of the stepping switch and the plugboard.

The programming means 276 is shown particularly in Figs. 19, 21, and 23 and includes a stepping switch, mounted on a supporting bracket 377, secured to the base of the recorder, and the plugboard 137, which is also mounted on a bracket 379, secured to the recorder base.

The stepping switch is an eight-level twenty-position switch having a stepping magnet SS1 and the usual wiper driving means, which is operated by the magnet armature 380 and is conditioned when the magnet is energized, and is operated and causes the wipers to be advanced when the magnet is deenergized. A pair of cams 381 (Fig. 21), which are secured to the wipers to rotate therewith, cooperate with Off-normal contacts SS1a4 and allow these contacts to be closed in all positions of the stepping switch except the home position. The armature 380 also operates two banks of contacts including contacts SS1a1 and SS1a2, which are closed when the magnet SS1 is energized; and SS1b3, which are opened when the magnet is energized (see also Fig. 24A). The manner in which these contacts exert their control will be explained when the circuit diagram, Figs. 24A and 24B, is described.

The eight levels of contacts of the stepping switch are used to obtain the necessary controls for four programs, each program being capable of providing up to eighteen steps in a punching sequence. Two levels of the switch are required for each program, the levels SSIA and SSIB being used for program I, levels SSIIA and SSIIB being used for program II, etc.

As shown most clearly in the schematic wiring diagram of Fig. 23, the wipers for levels SSIA and SSIB are connected to the terminals in the portion of section 390 of the recorder plugboard 137 which is related to program I. Similarly, the wipers for levels SSIIA and SSIIB, SSIIIA and SSIIIB, and SSIVA and SSIVB are connected to the terminals in the respective portions of the section 390 of the plugboard which are related to programs II, III, and IV.

The first nineteen contacts of levels SSIA and SSIB are individually connected to terminals in section 391 of the recorder plugboard 137 to enable the circuit to be completed to the various terminals in sequence as the stepping switch wiper is advanced over its related bank of contacts. Similarly, the contacts of levels SSIIA and SSIIB, SSIIIA and SSIIIB, and SSIVA and SSIVB are individually connected to sections 392, 393, and 394, respectively, of the plugboard 137. The twentieth contacts of the several levels are connected together to a conductor 395, which is used to control a circuit to initiate the stepping of the switch from its home position, as will be explained when the circuit diagram of Figs. 24A and 24B is described.

Sections 396 and 397 of the plugboard contain groups of terminals which are connected to circuits for coordinating the operation of the reading apparatus with the recorder during a program.

A section 397 of the plugboard contains a plurality of terminals which are connected together and to a circuit for causing the stepping switch to be reset to home position.

Sections 399 and 400 of the plugboard are connected to control circuits in the reading apparatus and are used to control the initiation of a card-reading operation.

The remaining terminals of the plugboard are connected together in groups to supply buses which may be used to expand the capacity of the other sections as desired.

The manner in which the various sections of the plugboard are interconnected and exert their controls in building up programs will be explained fully when the circuit diagram is described.

Circuit diagram

The circuits involved in coordinating the operation of the card-reading apparatus and the recorder are shown in Figs. 24A and 24B. In these figures, certain switches, which are mere duplicates of others, as certain levels of the stepping switch and certain portions of the plugboard, have been omitted, as their operation is substantially the same as that of the ones shown and will be clear from the explanation of the operation of the ones which are shown.

In order that the explanations of the circuits will be clearer, they will be described as they function in preparing the apparatus for operation and in carrying out typical operations of the apparatus.

Power is turned on by closing the main power switch MS (Fig. 1), which is located on the cabinet of the card-reading apparatus. The operation of the switch MS closes the circuit to make the usual 110-volt, 60-cycle A. C. available to the motor 154 of the card-reading apparatus and to the recorder motor 271 and, through the rectifier 373, to supply D. C. operating potential to the control circuits over conductors 401 and 402.

The application of operating potential to conductors 401 and 402 immediately causes the "operate" lamp 375 on the recorder to light, to indicate that operating potential is being supplied to the control circuits, putting the apparatus in condition for operation. The tape supply indicator light 333 in the recorder will also light if the supply of tape is low and contacts SC12a1 in the recorder have been closed.

The application of operating potential to conductors 401 and 402 also causes relay K3 to be energized over relay contacts K1bc3, the normally closed contacts PB1bc1 of the leader advance push button PB1 and over relay contacts K22bc4. The energization of relay K3 opens relay contacts K3bc1 to interrupt the circuit to the motors 154 and 271 of the card-reading apparatus and the recorder, respectively, to prevent these motors from operating until a card-reading and tape-recording operation is taking place.

The energization of relay K3 also opens contacts K3bc2 (Fig. 24A) to open a shunt circuit which extends across a 27,000-ohm resistor 405, which is connected in series with a 60-microfarad filter capacitor 406 between the conductors 401 and 402. The removal of the shunt from across the resistor 405 allows the resistor to became effective with the capacitor 406 to reduce the voltage between conductors 401 and 402 during standby operations when the reading apparatus and the recorder are not being operated.

The apparatus is now in condition to record the data under control of the card-reading apparatus. If the data is the first to be recorded on the tape, then it will be necessary to prepare a leader or run-in length of tape to be used in introducing the tape in an apparatus for reading and utilizing the data recorded on the tape. The leader section of the tape is identified by special leader advance code perforations on the tape, which, in the embodiment being described, will consist of perforations in channels 1 through 6 across the tape, in addition to the feed holes.

The card-reading apparatus is not involved in the preparation of the leader section of the tape, which is produced by the operation of the recorder alone when the leader advance push button PB1 (Fig. 24A) is operated to open contacts PB1bc1 and close contacts PB1ac1.

The opening of contacts PB1bc1 deenergizes relay K3, which in turn closes contacts K3bc1 to supply operating power to the recorder motor 271, and closes contacts K3bc2 to shunt out the resistor 405 and increase the potential supplied across the conductors 401 and 402.

The closing of contacts PB1ac1 will complete a circuit over relay contacts K1bc3 to energize relay K8, which will close contacts K8a2 to K8a7 (Fig. 24B) to complete circuits from conductor 401 over relay contacts K1bc3 and conductor 403 to the punch selector magnets PS1 to PS6, related to channels 1 to 6. The release of the punch-selecting levers by the operation of the punch selector magnet causes the bail 309 to close contact SC7a1 (Fig. 24A) to energize the punch clutch trip magnet L9. This will cause the punching mechanism to cycle and the tape to be perforated in channels 1 to 6, with the desired code. The punching will continue as long as the leader advance push button PB1 is operated. When the push button is released, relay K3 will be reenergized and relay K8 will be deenergized.

In order to prevent erroneous punching, which might occur if the leader advance push button PB1 were operated only momentarily and not long enough to insure a proper operation of the punch selector magnets, relay K8 closes a holding circuit for itself over contacts K8ac1 and SC6b2, which remains closed until 90 degrees of the operation of the punching mechanism, thereby maintaining relay K8 operated until punch selection has taken place, even though the push button PB1 may have been released.

It is to be noted that the six-hole leader advance code is merely the one used in the exemplary embodiment, and that any other code may be used merely by having the necessary ones of the contacts of relay K8 close circuits to the proper punch selector magnets; or, if no code punching is required, then relay K8 can close a circuit directly to the punch clutch trip magnet L9, which will cause the punch to operate to feed the tape through the recorder and punch only feed holes in the tape.

With a proper leader on the tape, the apparatus is now ready to handle the recording of data under control of the card-reading apparatus.

The first step in the recording of data under control of a card is to place the card in the card chute of the card-reading apparatus until the card engages the card stops. In this position, the card will cause contacts SC20a1 (Fig. 24B) to close in a circuit from conductor 401. The circuit extends from conductor 401 over contacts SC20a1, point 407, contacts SC21b1, which are controlled by the reading apparatus and are closed until the twenty-seventh operation of the reading apparatus, to point 408, where it branches, one branch going over closed relay contacts K22bc3, to prepare a circuit to control relays K20 and K9. The other branch goes to the motor bar switch PB2a1 of the reading apparatus to condition the motor bar circuit so that an operation of the motor bar can initiate a card-reading operation.

With the card in place in the reading apparatus, the next operation is to operate the motor bar PB2 of the reading apparatus. This closes contacts PB2a1 and continues the circuit from point 408 over contacts PB2a1 to the alining pin solenoid L20, which operates and moves the alining pins forward to engage the tag.

If the card is improperly positioned and the alining pins cannot pass through the alining holes 54 and 55, contacts L20a1, L20ac2 will not be closed, and contact L20bc2 will not open. This will prevent the relays K20 and K9 from being energized and the reading apparatus from operating. After the release of the motor bar push button PB2, the card can be removed and can properly be located in the chute.

When the card is in proper position in the chute, the alining pins can pass through the locating holes 54 and 55 in the card when solenoid L20 is energized, to properly aline the card relatively to the sensing means. The pins will also serve to lock the card in reading position in the reading apparatus to prevent premature removal of the card from the chute. The movement of the pins into holes in the card will cause contacts L20a1 and L20ac2 to close, and will cause contacts L20bc2 to open.

Contacts L20bc2 interrupt the circuit to the card advance solenoid L21 (Fig. 24B) to prevent any card-feeding operations while the alining pins are in the holes in the card. Contact L20ac2 prepares a circuit from conductor 401 over contacts L21b1 to the card stop solenoid L22, which circuit will be completed when either relay K22 or K1 operates.

Contacts L20a1 complete a circuit from point 408 over the relay contacts K22bc3 to the control relays K20 and K9, causing them to operate. Relays K20 and K9 prepare the reading apparatus and the recorder for a card-reading operation.

When relay K20 operates, it operates its various contacts as follows:

Contacts K20a7 close and complete a holding circuit for solenoid L20 from point 407 to maintain the solenoid energized even after the motor bar has been released.

Contacts K20ac6 close a circuit over relay contacts K22bc1 to energize the disabling yoke solenoid L24 to free the sensing pin control arms 140 to the control of the cam line.

Contacts K20a8 (Fig. 24A) close a circuit from conductor 401 over contacts L22bc1 to terminal 399 and 400 of the plugboard 137 and over plugboard connectors 410 and 411 to terminals in section 390 of the plugboard which are connected to the wipers of levels SSIA and SSIB of the stepping switch, which levels are to be effective in a card-reading operation. This circuit continues over the #20 position in levels SSIA and SSIB, and over conductor 395 and contacts K1bd4 and K4b1 to the operate relay K1.

Contacts K20a3 (Fig. 24A) prepare another energizing circuit to relay K3, which circuit extends over relay contacts K22ac4 and will be completed when the reset relay K22 of the reading apparatus operates.

Contacts K20b5 (Fig. 24B) interrupt one energizing circuit for relay K22 to prevent relay K22 from being energized, along with the clutch solenoid L23 of the reading apparatus over the clutch solenoid energizing circuit, and to prevent the clutch-operating circuit from being energized over the energizing circuit for relay K22.

When relay K9 operates, its contacts K9ac1 close in the circuit from the terminals in section 396 of the plugboard to the clutch solenoid L23 of the reading apparatus, and its contacts K9bc1 open to disconnect conductor 395 from the terminals in section 396 of the plugboard.

The circuit, which is completed over contacts L22bc1, relay contacts K20a8, positions #20 of levels SSIA and SSIB of the stepping switch, conductor 395 and contacts K1bd4 and K4b1, energizes "operate" relay K1, which closes a holding circuit for itself from conductor 401 over contacts K4b1 and K1ad4. Contacts K1ad4 also prepare a circuit to the stepping switch contacts SS1a2, which becomes effective as the stepping switch operates.

Contacts K1bd4 open to interrupt the energizing circuit for relay K1 and also to disconnect conductor 395 from the holding circuit for relay K1, which has been completed over contacts K1ad4.

Contacts L1ac2 close a circuit from conductor 401 over punch-controlled contacts SC6b2 and relay contacts K8bc1 to energize the stepping switch magnet SS1. Contacts SC6b2 in this circuit open in each punching operation.

Contacts K1bc2 open in the "homing" circuit for the stepping switch, which circuit includes the "off-normal" contacts SS1a4 and the self-interrupting contacts SS1b3, to prevent resetting of the stepping switch at this time.

Contacts K1bc3 open the circuit over the leader advance push button PB1 to relay K3, deenergizing relay K3, which in turn allows contacts K3bc1 to close and supply power to the motors 154 and 271 of the reading apparatus and the recorder, respectively.

Contacts K1bc3 (Fig. 24A) also open the circuit over conductor 403 to contacts K8a2 to K8a7 (Fig. 24B) to prevent punching of the leader advance code in this operation when relay K8 is energized in order to advance the stepping switch.

Contacts K1b1 (Fig. 24A) open to disconnect relay K8 from the punch trip clutch magnet L9 operating circuit over contact SC6b2 to prevent the relay from being held over these contacts and the contacts K8ac1 when relay K8 is energized to control the stepping of the stepping switch.

Contacts K1a5 (Fig. 24B) close to complete the circuit to the card stop solenoid L22, which circuit was previously prepared by the closing of contact L20ac2. The operation of the solenoid L22 removes the stops from the card chute.

Contacts K1b6 (Fig. 24B) open to prevent premature operation of the reset relay K22.

When card stop solenoid L22 operated, it closed contacts L22ac1 to provide a holding circuit for itself from conductor 401 over contacts L22ac1 and L21b1 to maintain the solenoid L22 energized, even after solenoid L20 has returned to unoperated condition.

The operation of the solenoid L22 opens contacts L22bc1 to interrupt the circuit over relay contacts K20a8 and the wipers of levels SSIA and SSIB of the stepping switch. The circuit over the wipers is now connectable to conductor 401 over contacts K1ad4 and the stepping switch contacts SS1a2, contacts SS1a2 serving to interrupt the circuit to the wipers before they move from contact to contact, thereby preventing arcing at the contacts.

When the stepping switch magnet SS1 was energized by the closure of contacts K1ac2, it operated to close the above-noted contacts SS1a2 and also to close contacts SS1a1.

Closure of the contacts SS1a2 at this time completes the circuit over the #20 position of the levels SSIA and SSIB of the stepping switch and over conductor 395 and contacts SS1a1, which are also closed at this time, to the relay K8, which is energized and opens contacts K8bc1 in the circuit to the stepping switch magnet SS1, deenergizing the magnet and allowing the switch to shift the wipers to the #1 contacts in levels SSIA and SSIB.

The deenergization of the stepping switch magnet SS1 allows contacts SS1a1 to open to deenergize relay K8, which in turn allows contacts K8bc1 to reclose and restore the energizing circuit for the stepping switch magnet SS1 over the punch control contacts SC6b2.

The reenergization of the stepping switch magnet SS1 recloses contacts SS1a2, which complete a circuit over contacts K1ad4, SS1a2, and the wipers of levels SSIA and SSIB of the stepping switch, to the #1 position in these levels.

It is to be noted that, in order to simplify the wiring diagram, the wiring connections between the levels SSIA and SSIB and SSIIA and SSIIB of the stepping switch, and the sections 391 and 392 of the plugboard, which are fully shown in Fig. 23, have been omitted from Fig. 24A, and the plugboard connectors will be shown as extending from the stepping switch itself.

The #1 position in levels SSIA and SSIB of the stepping switch may be connected by plugboard connectors to the card-reading apparatus or may be connected to the punch selector magnets if fixed arbitrary data is to be punched prior to the punching of data from the card. If the fixed arbitrary data contains several digits, then the necessary number of positions of the stepping switch will be used to punch these digits, and the following positions on the stepping switch will be connected to the controls for causing the card reading to begin. In the instant embodiment, the apparatus will be connected to cause the card reading to begin immediately, without any punching of fixed data; hence, when the stepping switch is in its #1 position, the card-reading operation will begin.

Plugboard connectors 415 and 416 connect the #1 positions of levels SSIA and SSIB to terminals in sections 396 and 397 of plugboard 137.

The circuit over the #1 position in level SSIA extends from the terminal in section 396 of the plugboard, over contacts K9ac1 and SC22b1 to energize the clutch solenoid L23 of the reading apparatus to start the first cycle of the apparatus to read the first column of the card.

Contacts SC22b1, which are located in the reading apparatus, are controlled from the cam line and are opened as the cam line moves out of home position in this first operation of reading the card. It is to be noted that contacts SC6a1 parallel contacts SC22b1 in the circuit over contacts K9ac1 to the clutch solenoid L23. Contacts SC6a1, which are located in the punching mechanism and are closed from 90 to 230 degrees in the cycle of the punching operation, are closed during the punching operation which records the data which has been read from a column of the card, and operate to reclose the circuit to the clutch solenoid L23 to trip the reading apparatus for a further reading operation.

While the reading apparatus is operating to read the various columns on the card, it is necessary that the stepping switch be kept energized to prevent the wipers from moving from position #1. The other circuit closed by contacts SS1a2 takes care of this condition, the circuit extending from over the #1 position in level SSIB and plugboard connector 416 to the terminal in section 397 of the recorder plugboard and thence over conductor 425 and contacts K8bc1 and K1ac2 to the stepping switch magnet SS1, and maintaining the energizing circuit for the stepping switch magnet SS1 effective even though contacts SC6b2 in the punching mechanism open during the punching of the data which is read from the card.

In the first operation of the cam line of the reading apparatus, the five sensing pins for the first column at the left of the card are allowed to move to sensing position. Since the same coding is used for data on the card as is used for recording of data on the tape, two of the five sensing pins will pass through holes in this column of the card and will close their related ones of the contacts SC25a1 to SC25a5.

As explained earlier, these contacts SC25a1 to SC25a5 are common to the sensing pins of all the columns of the sensing means and are connected to groups of terminals in section 136 of the plugboard 137 of the recorder, from which section five plugboard connecters 426 extend to the punch selecting section 138 of the plugboard 137 to enable the contacts to control the selection of the punches.

The plugboard connections between the terminals in sections 136 and 138 of the plugboard 137 in the instant embodiment connect contacts SC25a1 to punch selector magnet PS1, connect contacts SC25a2 to punch selector magnet PS2, connect contacts SC25a3 to punch selector magnet PS3, etc. This causes the data in the various columns of the card to be recorded in channels 1 to 5 on the tape. It is to be understood that the invention is not limited to this arrangement of interconnections, and other arrangements can be used, if desired.

Contacts SC24a1, which are operated by the cam 164 in the reading apparatus, are closed from 285 to 345 degrees in the cycle of operation of the apparatus and, when closed, complete the circuit over the selected contacts of the groups SC25a1 to SC25a5 to energize the selected punch selector magnets to release their punch selecting levers.

The released punch selecting levers close contacts SC7a1 to energize the punch clutch trip magnet L9 to initiate a punching operation to punch the tape according to the perforations in the first column of the card.

At 90 degrees in the punching cycle, contacts CS6a1 close the circuit to the clutch solenoid L23, to initiate the second reading operation. In this operation, the cam line makes a further operation, which restores the sensing pins for column 1 to ineffective position and frees the sensing pins for column 2, so that they can selectively close contacts of the groups SC25a1 to SC25a5, according to perforations in column 2 on the card. During this operation of the reading apparatus, contacts SC24a1 close to energize the selected punch selector magnets to release punch selecting levers, which in turn initiate an operation of the punching means to reproduce the data of column 2 on the card.

The operations of the reading apparatus to read the columns of the card will continue until all the desired columns of the card have been read. As explained earlier, the cam 150 can be adjusted on the cam line so that the reading apparatus can read any number of columns up to twenty-five before the cam operates the "end of card" contact SC23a1. In the embodiment being described, twenty-three columns are to be read, and the "end of card" contacts SC23a1 (Fig. 24B) are to operate in the twenty-fourth operation of the cam line.

When column 23 is read, the punch selector magnets are energized and the operation of the punching mechanism takes place as above described. In this cycle of operation of the punching mechanism, contacts SC6a1 close to energize the clutch solenoid L23 to cause the twenty-fourth operation of the cam line.

In the twenty-fourth operation of the cam line, the cam 150 closes the "end of card" contacts SC23a1 early in the cycle. The closure of the contacts SC23a1 completes an energizing circuit for the reset relay K22, causing it to be energized, the circuit including contacts SC22a2, which are controlled from the cam 151 on the cam line and are closed except in the home position of the cam line.

The energization of relay K22 opens contacts K22bc1 in the circuit to the disabling yoke solenoid L24 to deenergize the solenoid and allow the yoke to engage the arms to hold all the sensing pins in their retracted positions to prevent the reading of further columns of the card. Since the sensing pins are prevented from moving forward, none of the contacts SC25a1 to SC25a5 will close to energize punch selector magnets, and no further punching will be made on the tape.

Relay K22 operates other contacts as follows:

Contacts K22ac1, which are in parallel with contacts SC23a1 and K1b6, close to hold relay K22 energized after the "end of card" contacts SC23a1 have opened and after the relay K1 has been deenergized. This holding circuit will be maintained until contacts SC22a2 are opened in the twenty-eighth, or home, position of the cam line.

Contacts K22a2 close in the circuit to card stop solenoid L22 to maintain the solenoid energized and the card stops retracted even after the relay K1 has been deenergized.

Contacts K22ac3 close to provide a holding circuit to the alining pin solenoid L20 over contacts SC20a1, point 407, and contacts SC21b1, and point 408, to maintain the solenoid energized. Contacts SC21b1 are not opened until the twenty-seventh operation of the cam line and maintain the alining pin solenoid energized until this time, even after relay K20 has been deenergized.

Contacts K22bc4 open to interrupt the energizing circuit for relay K3, which extends over the relay contacts K1bc3 and the leader advance push button contacts PB1bc1 to prevent the relay K3 from being energized over this circuit when relay K1 is deenergized.

Contacts K22bc3 open in the circuit from point 408 to the relays K20 and K9 to interrupt the energizing circuit for these relays.

When relay K20 is deenergized, contacts K20a3 open to interrupt a circuit over contacts K22ac4 to immediately deenergize relay K3 to restore operating power to the motors 154 and 271, so that the reading apparatus and the recorder can operate further.

Contacts K20ac6 open to maintain the disabling yoke solenoid L24 deenergized even after the reset solenoid K22 is deenergized when contacts SC22a2 open in the #28, or home, position of the cam line.

The deenergization of relay K9 opens contacts K9ac1 in the energizing circuit from level SSIA of the stepping switch to the clutch solenoid L23.

The deenergization of relay K20 allows contacts K20b5 to reclose to energize the clutch solenoid L23 from the holding circuit for relay K22, which circuit extends from conductor 401 over contacts K22ac1 and SC22a2, which are controlled by the cam 151 on the cam line and remain closed until the twenty-eighth operation of the cam line moves it into home position. This circuit allows the solenoid L23 to remain energized to recycle the reading apparatus through repeated cycles until contacts SC22a2 open in the twenty-eighth, or "home," position of the cam line When the cam line is in its twenty-seventh, or next-to-last, position, contacts SC21b1 are opened by cam 152, to interrupt the holding circuit for the alining pin solenoid L20 from point 408 over contacts K22ac3, releasing the solenoid and allowing the alining pins to be withdrawn from the card.

The deenergization of the solenoid L20 allows contacts L20bc2 to close and complete a circuit from conductor 401 over contacts L22ac1 and contacts L20bc2, to energize the card advance solenoid L21, which causes the card to be fed from reading position.

At the end of the card feeding operation, contacts L21b1 open to deenergize solenoid L22 to allow the card stops to return into position in the card chute. Solenoid L22 remains deenergized because contacts L22ac1 and L20ac2 are both opened at this time.

When the cam line has returned to its home position and has opened contacts SC22a2 to deenergize reset relay K22 and to open the circuit to the clutch solenoid L23 to prevent further cycling of the reading apparatus, the reading of the card has been completed, and the various parts of the reading apparatus have been restored to home position, ready to read a further card.

When relay K9 was deenergized, it allowed contacts K9bc1 to close to connect the terminal in section 396 of the plugboard to conductor 395 and complete an energizing circuit over conductor 395 and contacts SS1a1 to relay K8 to energize this relay. Energization of relay K8 opens contacts K8bc1 to deenergize the stepping switch magnet SS1, which allows the wipers to move to their #2 position.

The data which is recorded under control of the card may or may not be followed by the recording of predetermined fixed data.

If no fixed data is to be punched in the tape under control of the programming means, then position #2 of level SS1B of the stepping switch is connected by means of plugboard connector 429 to one of the terminals in section 398 of the plugboard, which terminals are connected to relay K4.

It should be noted that, when the stepping switch left position #1, the circuit over the terminal in section 396, contacts K9bc1, conductor 395, and contacts SS1a1 would be opened, and relay K8 would be deenergized. No connection is made to this circuit from position #2 of the stepping switch, and the relay K8 will remain deenergized, allowing the circuit to be completed over contacts SC6b2, K8bc1, and K1ac2 to energize the stepping switch magnet SS1.

Energization of the stepping switch magnet SS1 at this time also closes contacts SS1a2 to complete a circuit from conductor 401 over contacts K1ad4, SS1a2, wiper for level SS1B, plugboard connector 429, terminal in section 398, and relay K4 to energize relay K4, which restores parts of the recorder to home position.

The energization of relay K4 opens contacts K4b1 in the circuit to relay K1, deenergizing relay K1, which in turn interrupts its own holding circuit by opening contacts K1ad4.

The deenergization of relay K1 opens contacts K1ac2 to interrupt the energizing circuit for the stepping switch magnet SS1 over the punching-mechanism-controlled contacts SC6b2, and closes contacts K1bc2 to render the "homing" circuit for the stepping switch effective. The "homing" circuit extends from conductor 401 over "off-normal" contacts SS1a4, which remain closed until the stepping switch is restored to home position, over self-interrupting contacts SS1b3 and relay contacts K1bc2. This circuit will cause the stepping switch to operate repeatedly to step the wipers over the contacts until the wipers return to "home," or starting, position, in which position the recorder is in condition to record further data under control of the reading apparatus.

With the card having been read and fed from reading position, and with the stepping switch in its home position, the apparatus is ready for further card-reading operations.

If the data which is read from the card is to be followed by arbitrary fixed data, then the position #2 of the stepping switch and the following positions which may be necessary to record the fixed data are connected to the punch selecting magnets directly by plugboard connectors, and the fixed data will be recorded as the stepping switch is stepped through these positions, so that the data will be recorded on the tape. During the recording of the fixed data, the contacts SC6b2, which are opened in each punching operation, will cause the stepping switch to be advanced as punching progresses.

In the recording operation explained above, since no fixed data was recorded, the tape will have been punched with the data from columns 1 to 23 of the card, and the apparatus will have been made ready to record data from another card, which card may be inserted into the card-reading apparatus and the apparatus operated under control of the push button PB2.

It is believed that the card-reading apparatus and its operation will be clear from the above description.

While the form of mechanism shown and described herein is admirably adapted to fulfill the objects primarily stated, it is to be understood that it is not intended to confine the invention to the one form or embodiment disclosed herein, for it is susceptible of embodiment in various other forms.

What is claimed is:

1. In an apparatus for reading cards on which data is recorded by perforations in any of a plurality of data representing positions in a plurality of columns, the combination of a plurality of sensing pins, one for each data representing position in each column on the card; means normally urging the pins to sensing position; and control means cooperating with the sensing pins and normally restraining the pins from movement to sensing position, said control means being operable to release the pins one column at a time, column by column, to read the data from the card one column after another in succession.

2. In an apparatus for reading cards on which data is recorded by perforations in any of a plurality of data representing positions in a plurality of columns, the combination of a plurality of sensing pins, one for each data representing position in each column on the card; means normally urging the pins to sensing position; cyclically operable control means cooperating with the sensing pins and normally restraining the pins from movement to sensing position, said control means being operable, in each cycle of operation thereof, to release the pins for a different one of the columns to read the data from the card, one column after another in succession; and means to cause the cyclic operation of the control means.

3. In an apparatus for reading cards on which data is recorded by perforations in any of a plurality of data representing positions in a plurality of columns, the combination of a plurality of sensing pins, one for each data representing position in each column on the card; means normally urging the pins to sensing position; control means cooperating with the sensing pins and normally restraining the pins from movement to sensing position, said control means being operable to release the pins one column at a time, column by column, to read the data from the card one column after another in succession; and terminating means cooperating with the control means to override the control by the control means and terminate the reading operation, said terminating means being adjustable to prevent further reading operations after any desired number of columns have been read.

4. In an apparatus for reading cards on which data is recorded by perforations in any of a plurality of data representing positions in a plurality of columns, the combination of a plurality of sensing pins, one for each data representing position in each column on the card; means normally urging the pins to sensing position; control means cooperating with the sensing pins and normally restraining the pins from movement to sensing position, said control means being operable to release the pins one column at a time, column by column, to read the data from the card one column after another in succession; and terminating means cooperating with the control means to restrain the sensing pins from sensing the card to thereby terminate the reading operation, said terminating means being adjustable to prevent further reading operations after any desired number of columns have been read.

5. In an apparatus for reading cards on which data is recorded by perforations in any of a plurality of data representing positions in a plurality of columns, the combination of a plurality of sensing pins, one for each data representing position in each column on the card; a spring contact for each pin, each contact normally urging its related pin to sensing position; and control means cooperating with the sensing pins to normally restrain the pins from movement to sensing position and thereby maintain the contact in open position, said control means being operable to release the pins one column at a time, column by column, to read the data from the card one column after another in succession, the pins which find holes in the card allowing their related contacts to close to convert the data into electrical output signals.

6. In an apparatus for reading cards on which data is recorded by perforations in any of a plurality of data representing positions in a plurality of columns, the combination of a plurality of sensing pins, one for each data representing position in each column on the card; means normally urging the pins to sensing position; cyclically operable control means cooperating with the sensing pins and normally restraining the pins from movement to sensing position, said control means being operable, in each cycle of operation thereof, to release the pins for a different one of the columns to read the data from the card, one column after another in succession; means to cause the cyclic operation of the control means; means controlled by the sensing pins to utilize the data as it is read; and means in the utilizing means for controlling the means for causing the cyclic operation of the control means to cause the control means to operate and allow a further column on the card to be sensed if the previously sensed data has been utilized.

7. In an apparatus for reading cards on which data is represented by data perforations at data representing positions in a plurality of columns, the combination of means to hold the card stationary in card reading position throughout the reading of the plurality of columns, a plurality of sensing pins, one for each data representing position in each column position on the card; means normally urging the sensing pins to sensing position; and control means cooperating with the pins to control the sensing of the card, said control means normally holding the pins in non-sensing position and restraining their movement to sensing position but operable to release the pins, one column at a time in succession, for movement to sensing position, to enable the data to be read, column by column, in succession while the card remains stationary in reading position.

8. In an apparatus for reading cards on which data is represented by data perforations at data representing positions in a plurality of columns, the combination of means operable to aline the card in card reading position and to hold the card stationary in card reading position while the plurality of columns are read during a card reading operation; a plurality of sensing pins, one for each data representing position in each column position on the card; means normally urging the sensing pins to sensing position; control means cooperating with the pins to control the sensing of the card, said control means normally holding the pins in non-sensing position and restraining their movement to sensing position but operable in a card reading operation to release the pins, one column at a time in succession, for movement to sensing position, to enable the data to be read, column by column, in succession while the card remains stationary in reading position; means to operate the card alining and holding means and to initiate a card reading operation; and means to release the card alining and holding means at the end of a card reading operation.

9. In an apparatus for reading cards on which data is represented by data perforations at data representing positions in a plurality of columns, the combination of means operable to lock the card in card reading position; means to feed the card from reading position; a plurality of sensing pins, one for each data representing position in each column position on the card; means normally urging the sensing pins to sensing position; control means cooperating with the pins to control the sensing of the card, said control means normally holding the pins in non-sensing position and restraining their movement to sensing position but operable to release the pins, one column at a time in succession, for movement to sensing position, to enable the data to be read, column by column, in succession while the card remains stationary in reading position; means to initiate a card reading operation and to operate the card locking means; and means operable at the end of a card reading operation to release the locking means and to cause the card feeding means to feed the card from card reading position.

10. In an apparatus for reading record cards on which data is represented by perforations, the combination of a row of sensing pins; an input electrical bus; a plurality of contact springs on the bus, one for each sensing pin, said contact springs normally urging their related sensing pins to sensing position; an output electrical bus engageable by the springs to complete a circuit from the input bus to the output bus; and control means cooperable with the pins to control the sensing of the card, said control means normally holding the sensing pins in non-sensing position, where they maintain the springs out of engagement with the output bus, but operable to release the pins one at a time in succession for movement to sensing position, those pins which find holes in the card when they are released allowing their related contact springs to engage the output bus to connect the input bus to the output bus to convert the sensed data into electrical output signals.

11. In an apparatus for reading cards on which data is represented by perforations at required ones of data representing positions, the data representing positions forming intersecting rows and columns on the card, the combination of a plurality of sensing pins, one for sensing each data representing position on a card; a switching means controlled by the sensing pins to convert the sensed data into electrical output signals, said switching means including an input bus for each row of sensing pins, an output bus for each row of sensing pins, and a resilient contact for each sensing pin, each contact connected to an input bus, normally urging the sensing pin to sensing position, and operable to connect its input bus to its related output bus when its sensing pin senses a perforation in a card; and control means cooperable with the sensing pins, to render the pins operable, column by column, one column at a time, to sense the card, said sensing pins which find holes in the card allowing their related contacts to engage output buses and provide output signals successively on the output buses as the columns of the card are sensed in succession.

12. In an apparatus for reading cards on which data is represented by perforations at required ones of data representing positions, the data representing positions forming intersecting rows and columns on the card, the combination of a plurality of sensing pins, one for sensing each data representing position on a card; a switching means controlled by the sensing pins to convert the sensed data into electrical output signals, said switching means including an input bus for each row of sensing pins, an output bus for each row of sensing pins, and a resilient contact for each sensing pin, each contact connected to an input bus, normally urging the sensing pin to sensing position, and operatble to connect its input bus to its related output bus when its sensing pin senses a perforation in a card; and control means cooperable with the sensing pins, to control the operation of the pins to sense the data on the card, said control means normally restraining the pins from movement to sensing position and maintaining the contacts out of engagement with the output buses but operable to free the pins, column by column, one column at a time, to sense the card, said freed sensing pins which find holes in the card allowing their related contacts to engage output buses and provide output signals successively in the output buses as the columns of the card are sensed in succession.

13. In an apparatus for reading cards on which data is recorded by perforations in any of a plurality of data representing positions in a plurality of columns, the combination of a plurality of sensing pins, one for each data representing position in each colmn on the card; means normally urging the pins to sensing position; and cyclically operable control means operable in a plurality of steps in each cycle to control the effectiveness of the pins to sense a card, said control means including a control mechanism for each column of pins, which control mechanism cooperates with the sensing pins of its related column and operates to free the sensing pins of its related column for sensing operation during a predetermined step in the cycle and to maintain the sensing pins in effective position at all other times in the cycle, and said control mechanisms being so arranged relatively to each other in the control means as to free the sensing pins, column by column, in the successive steps of the cycle.

14. In an apparatus for reading cards on which data is recorded by perforations in any of a plurality of data representing positions in a plurality of columns, the combination of a plurality of sensing pins, one for each data representing position in each column on the card; means normally urging the pins to sensing position; and cyclically operable control means operable in a plurality of steps in each cycle to control the effectiveness of the pins to sense a card, said control means including a control arm for each column of pins and a cam for each control arm to control the positioning thereof, each control arm cooperating with the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other in the control means as to free the sensing pins, column by column, in the successive steps of the cycle.

15. In an apparatus for reading cards on which data is recorded by perforations in any of a plurality of data representing positions in a plurality of columns, the combination of a plurality of sensing pins, one for each data representing position in each column on the card; means normally urging the pins to sensing position; cyclically operable control means operable in a plurality of steps in each cycle to control the effectiveness of the pins to sense a card, said control means including a control mechanism for each column of pins, which control mechanism cooperates with the sensing pins of its related column for sensing operation during a predetermined step and operates to free the sensing pins of its related column in the cycle and to maintain the sensing pins in ineffective position at all other times in the cycle, and said control mechanisms being so arranged relatively to each other in the control means as to free the sensing pins, column by column, in the successive steps of the cycle; means to cause a step of operation of the control means; means controlled by the sensing pins to utilize the data as it is read; and means in the utilizing means for controlling the means to cause a step of operation of the control means to cause the control means to make a further step of operation to allow a further column of the card to be sensed if the previously sensed data has been utilized.

16. In an apparatus for reading cards on which data is recorded by perforations in any of a plurality of data representing positions in a plurality of columns, the combination of a plurality of sensing pins, one for each data representing position in each column on the card; means normally urging the pins to sensing position; cyclically operable control means operable in a plurality of steps in each cycle to control the effectiveness of the pins to sense a card, said control means including a control arm for each column of pins and a cam for each control arm to control the positioning thereof, each control arm engaging the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other in the control means as to free the sensing pins column by column in the successive steps of the cycle; and reading terminating means cooperating with the control means and adjustable to terminate further reading operations after any predetermined step in the cycle.

17. In an apparatus for reading cards on which data is recorded by perforations in any of a plurality of data representing positions in a plurality of columns, the combination of a plurality of sensing pins, one for each data representing position in each column on the card; means normally urging the pins to sensing position; cyclically operable control means operable in a plurality of steps in each cycle to control the effectiveness of the pins to sense a card, said control means including a control arm for each column of pins and a cam for each control arm to control the positioning thereof, each control arm engaging the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other in the control means as to free the sensing pins column by column in the successive steps of the cycle; and reading terminating means cooperating with the control means and adjustable to terminate further reading operations after any predetermined step in the cycle, said terminating means including means to cause the control means to operate through the remaining steps of the cycle and including means cooperating with the arms to position the arms to hold the sensing pins in ineffective position during the remaining steps of operation of the control means.

18. In an apparatus for reading cards on which data is recorded by perforations in any of a plurality of data representing positions in a plurality of columns, the combination of means operable to aline the card accurately in position at a reading station and to lock the card in proper position at the reading station; means to feed a card from the reading station; a plurality of sensing pins at the reading station, one pin for each data representing position in each column on the card; means normally urging the pins to sensing position; cyclically operable control means operable in a plurality of steps in each cycle to control the effectiveness of the pins to sense a card, said control means including a control arm for each column of pins and a cam for each control arm to control the positioning thereof, each control arm engaging the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other in the control means as to free the sensing pins column by column in the successive steps of the cycle; means to initiate a cycle of operation of the control means and to render the alining and locking means effective to aline the card with the sensing pins and lock the card in reading position; and reading terminating means cooperating with the control means to terminate further reading operations after any predetermined step in the cycle, said terminating means including a further cam which operates step by step with the cams of the control means and is adjustable relatively thereto to become effective at any predetermined step in the cycle and including means operable under control of the further cam to render the sensing pins ineffective, to cause the continued stepping of the control means to complete the cycle of operation thereof, to release the card alining and locking means and to cause the card feeding means to operate to feed the card from reading position.

19. In an apparatus for reading cards on which data is recorded by perforations in any of a plurality of data representing positions in a plurality of columns, the combination of a plurality of sensing pins, one for each data representing position in each column on the card; means normally urging the pins to sensing position; cyclically operable control means operable to control the effectiveness of the pins to sense a card, said control means including a control arm for each column of pins and a cam line operable step by step and having thereon a cam for each control arm to control the positioning thereof, each control arm engaging the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other on the cam line as to free the sensing pins column by column in the successive steps of the cycle; and reading terminating means cooperating with the control means, said terminating means including a further cam which is adjustable on the cam line relatively to the other cams thereon and including means operated under control of the further cam to terminate reading operations after any predetermined step in the cycle and to complete the stepping of the cam line through the cycle.

20. In an apparatus for reading cards on which data is recorded by perforations in any of a plurality of data representing positions in a plurality of columns, the combination of a plurality of sensing pins, one for each data representing position in each column on the card; means normally urging the pins to sensing position; cyclically operable control means operable to control the effectiveness of the pins to sense a card, said control means including a control arm for each column of pins and a cam line operable step by step and having thereon a cam for each control arm to control the positioning thereof, each control arm engaging the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other on the cam line as to free the sensing pins column by column in the successive steps of the cycle; driving means to impart a step of operation to the cam line; means controlled by the sensing pins to utilize the data as it is read; means in the utilizing means for controlling the driving means to cause the cam line to make a further step of operation and allow a further column on the card to be sensed if the previously sensed data has been utilized; and reading terminating means cooperating with the control means, said terminating means including a further cam which is adjustable on the cam line relatively to the other cams thereon and including means operated under control of the further cam to terminate further reading operations after any predetermined step in the cycle and to complete the stepping of the cam line through the cycle.

21. In an apparatus for reading cards on which data is represented by perforations at required ones of data representing positions, the data representing positions forming intersecting rows and columns on the card, the combination of a plurality of sensing pins, one for sensing each data representing position on a card; a switching means controlled by the sensing pins to convert the sensed data into electrical output signals, said switching means including an input bus for each row of sensing pins, an output bus for each row of sensing pins, and a resilient contact for each sensing pin, each contact connected to an input bus, normally urging the sensing pin to sensing position, and operable to connect its input bus to its related output bus when its sensing pin senses a perforation in a card; and cyclically operable control means operable in a plurality of steps in each cycle to control the effectiveness of the pins to sense a card, said control means including a control arm for each column of pins and a cam for each control arm to control the positioning thereof, each control arm cooperating with the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other in the control means as to free the sensing pins column by column in the successive steps of the cycle; said freed sensing pins which find holes in the card allowing their related contacts to engage output buses and provide output signals successively on the output buses as the columns of the card are sensed in succession.

22. In an apparatus for reading cards on which data is represented by perforations at required ones of data representing positions, the data representing positions forming intersecting rows and columns on the card, the combination of a plurality of sensing pins, one for sensing each data representing position on a card; a switching means controlled by the sensing pins to convert the sensed data into electrical output signals, said switching means including an input bus for each row of sensing pins, an output bus for each row of sensing pins, and a resilient contact for each sensing pin, each contact connected to an input bus, normally urging the sensing pin to sensing position, and operable to connect its input bus to its related output bus when its sensing pin senses a perforation in a card; cyclically operable control means operable in a plurality of steps in each cycle to control the effectiveness of the pins to sense a card, said control means including a control arm for each column of pins and a cam for each control arm to control the positioning thereof, each control arm cooperating with the sensing pins of its related column and positioned by its related cam to free the sensing pins of its related column for sensing operation during a predetermined step in the cycle and to maintain the sensing pins in ineffective position at all other times in the cycle, and said cams being so arranged relatively to each other in the control means as to free the sensing pins column by column in the successive steps of the cycle, said freed sensing pins which find holes in the card allowing their related contacts to engage output buses and provide output signals successively on the output buses as the columns of the card are sensed in succession; and terminating means cooperating with the control means to terminate the reading of the card after any desired predetermined number of columns have been read, said terminating means including an adjustable means which is adjustable relatively to the cams to become effective in the required step of the cycle of the control means, including means operable under control of the adjustable means to engage the arms to prevent reading of the card regardless of the control exerted by the cams and including means set in operation by the adjustable means to cause the control means to step automatically through the remaining steps of its cycle.

References Cited in the file of this patent

UNITED STATES PATENTS 2,720,164    Braun et al. _____ Oct. 11, 1955